US006765638B1

(12) United States Patent
Masuzawa

(10) Patent No.: US 6,765,638 B1
(45) Date of Patent: Jul. 20, 2004

(54) REFLECTIVE LIQUID CRYSTAL DEVICE AND ELECTRONIC EQUIPMENT USING THE SAME

(75) Inventor: Akinori Masuzawa, Suwa (JP)

(73) Assignee: Seiko Epson Corporation, Toyko (JP)

( * ) Notice: Subject to any disclaimer, the term of this patent is extended or adjusted under 35 U.S.C. 154(b) by 0 days.

(21) Appl. No.: 09/472,509

(22) Filed: Dec. 27, 1999

(30) Foreign Application Priority Data

Dec. 25, 1998 (JP) .......................................... 10-369753

(51) Int. Cl.$^7$ .......................................... G02F 1/1335
(52) U.S. Cl. .................................... 349/114; 349/114
(58) Field of Search ............................... 349/113, 114, 349/137, 138

(56) References Cited

U.S. PATENT DOCUMENTS

| | | | | |
|---|---|---|---|---|
| 3,736,047 A | * | 5/1973 | Gelber et al. ................ | 349/114 |
| 4,456,336 A | * | 6/1984 | Chung et al. ................ | 349/113 |
| 4,521,079 A | * | 6/1985 | Leenhouts et al. .......... | 349/137 |
| 4,904,060 A | * | 2/1990 | Grupp ......................... | 349/112 |
| 5,926,240 A | * | 7/1999 | Hirota et al. ................ | 349/114 |
| 5,978,056 A | * | 11/1999 | Shintani et al. ............. | 349/137 |
| 6,124,912 A | * | 9/2000 | Moore ........................ | 349/113 |
| 6,344,888 B2 | * | 2/2002 | Yasukawa .................... | 349/113 |

FOREIGN PATENT DOCUMENTS

JP          06-289379 A          10/1994

* cited by examiner

Primary Examiner—Kenneth Parker
(74) Attorney, Agent, or Firm—Oliff & Berridge, PLC

(57) ABSTRACT

A reflective or transflective liquid crystal device employs an internal reflection system including reflecting electrodes serving as reflectors and provided on the side of a substrate, which contacts a liquid crystal, wherein the construction of the device and the manufacturing process therefor are simplified, and a bright high-quality image is displayed. In the reflective liquid crystal device, stripe reflecting electrodes, a transmissive insulating film having a single-layer structure and an alignment layer are provided on a first substrate. The refractive index of the transmissive insulating film is set to be lower than the refractive index of a liquid crystal and the refractive index of the alignment layer. The width of the transmissive insulating film is set to be not less than a first predetermined width with which the reflectance due to multiple reflection by a multilayer film, including the reflecting electrodes, the transmissive insulating film, and the alignment layer is at a maximum for blue light, and not more than a second predetermined width with which the reflectance of the multilayer film is at a maximum for red light.

8 Claims, 13 Drawing Sheets

REFLECTIVE LIQUID CRYSTAL DEVICE AND ELECTRONIC EQUIPMENT USING THE SAME

BACKGROUND OF THE INVENTION

1. Field of Invention

The present invention relates to a liquid crystal device, such as a reflective liquid crystal device, a transflective liquid crystal device, or the like, using a passive-matrix, an active-matrix or a segmented driving system, and to electronic equipment using the liquid crystal device. Particularly, the present invention relates to a liquid crystal device which employs an internal reflection system including a reflecting electrode serving as a reflector or transflector which is provided on the side of a substrate which faces a liquid crystal, and to electronic equipment using the same.

2. Description of Related Art

A reflective liquid crystal device using external light, and not a light source, such as a back-light, or the like, for display is advantageous from the viewpoints of low power consumption, miniaturization, weight reduction, etc., and is conventionally used for portable electronic equipment, such as portable telephones, wristwatches, electronic notebooks, notebook-type personal computers, and the like, in which, particularly, portability is regarded as important. A conventional reflective liquid crystal device includes a transmissive liquid crystal panel composed of a liquid crystal held between a pair of substrates, a reflector attached to the back of the transmissive liquid crystal panel so that external light incident on the front side is reflected by the reflector through the transmissive liquid crystal panel, a polarizer, etc. However, this device has a long optical path from the liquid crystal isolated by the substrates to the reflector, and thus causes parallax in a display image, causing double display. The conventional reflective liquid crystal device is thus unsuitable for high-definition image display, and it is very difficult to display a high-quality image, particularly in color display, because colors are mixed in the above-described long optical path. Furthermore, since external light is attenuated during the time from incidence on the liquid crystal panel to reflection by the reflector, it is difficult for the liquid crystal device to perform bright display.

Therefore, a reflective liquid crystal device having an internal reflection system has recently been developed, in which a display electrode arranged on one of a pair of substrates, which is opposite to the external light incidence side, includes a reflector so as to bring the reflection position near the liquid crystal layer. As an example of such a liquid crystal device, Japanese Unexamined Patent Publication No. 8-114799 discloses a technique including forming pixel electrodes serving as reflectors on a substrate, laminating two films including a high-refractive index layer and a low-refractive index layer, or alternately laminating the films in layers, and forming an alignment layer thereon. In this technique, a multilayer film, including a high refractive index layer and a low refractive index layer, is provided on the reflectors to increase the reflectance of external light incident on the counter substrate side, thereby achieving a bright reflective display.

In the technical field of this type of liquid crystal device, under the general demand for increasing the quality of display images, and decreasing cost, it is very important to simplify the construction of the device and the manufacturing process while improving the brightness and definition of a displayed image.

However, in order to obtain high reflectance, the above-mentioned technique, in which the pixel electrodes also serve as reflectors, requires a multilayer film of at least two layers including a high refractive index layer and a low refractive index layer, which are provided on the pixel electrodes, and thus has the problem of complicating the multilayer film structure and, by extension, the construction and manufacturing process of the device.

SUMMARY OF THE INVENTION

The present invention has been achieved in consideration of the above problem and it is one aspect of the present invention to provide a reflective or transflective liquid crystal device which permits simplification of the construction and manufacturing process of the device, and which can display a high-quality bright image. The liquid crystal device may also be used in a plurality of electronic equipment.

In order to solve the above problem, a liquid crystal device of the present invention may include a first substrate, a transmissive second substrate provided to oppose the first substrate, a liquid crystal held between the first and second substrates, a reflecting electrode arranged on the side of the first substrate, which is opposite to the second substrate, a transmissive insulating film having a single-layer structure provided on the reflecting electrode d an alignment layer provided on the transmissive insulating film. The refractive index of the transmissive insulating film is set to a value lower than the refractive index of the liquid crystal and the refractive index of the alignment layer, and the width of the transmissive insulating film is set to be not less than a first predetermined width with which reflectance of a multilayer film including the reflecting electrode, the transmissive insulating film, and the alignment layer is at a maximum for blue light incident on the second substrate side, and not more than a second predetermined width with which reflectance of the multilayer film is at maximum for red light incident on the second substrate side. In the present invention, the refractive index of the liquid crystal is defined as the average of the extraordinary refractive index $n_e$ and the ordinary refractive index $n_0$ of the liquid crystal.

In the liquid crystal device of the present invention, external light incident on the second substrate side is reflected by the multilayer film including the reflecting electrode, the transmissive insulating film, and the alignment layer, which are provided on the first substrate, through the transmissive second substrate and the liquid crystal, and is again emitted from the second substrate side through the liquid crystal and the second substrate. Therefore, for example, when a polarizer is arranged on the outer side of the second substrate, the strength of external light reflected by the reflecting electrode and emitted as display light through the liquid crystal can be controlled by controlling the alignment state of the liquid crystal using the reflecting electrode, i.e., an image can be displayed according to the image signal supplied to the reflecting electrode.

The external light reflectance of the multilayer film including the reflecting electrode, the transmissive insulating film, and the alignment layer provided on the first substrate adjacent to the liquid crystal is dependent on the wavelength and varies depending upon the refractive index of the transmissive insulating film. More specifically, it is found that with the refractive index of the transmissive insulating film lower than the refractive index of the liquid crystal and the reflective index of the alignment layer, the reflectance of the multilayer film for any of red light, blue light and green light, which together form white external light, is high. Therefore, in the present invention, the refractive index of the transmissive insulating film is set to be lower than the refractive index of the liquid crystal and the refractive index of the alignment layer.

The external light reflectance of the multilayer film including the reflecting electrode, the transmissive insulating film, and the alignment layer provided on the first substrate adjacent to the liquid crystal is dependent on the wavelength and varies depending upon the width of the transmissive insulating film. More specifically, it is found that the maximum reflectance occurs for blue light (i.e., electromagnetic waves at a wavelength of about 450 nm) with the transmissive insulating film having a relatively small width, and the maximum reflectance occurs for red light (i.e., electromagnetic waves at a wavelength of about 650 nm) with the transmissive insulating film having a relatively large width. It is also found that the maximum reflectance occurs for green light (i.e., electromagnetic waves at a wavelength of about 550 nm) with a width between the relatively small width with which the maximum reflectance occurs for blue light, and the relatively large width with which the maximum reflectance occurs for red light. Namely, the width of the transmissive insulating film with which the maximum reflectance is obtained increases in the order of blue light, green light and red light. Therefore, in order to increase the reflectance for three colors of light which form external white light, the width of the transmissive insulating film is preferably set to a width between the width (i.e., the first predetermined width) with which the maximum reflectance for blue light occurs, and the width (i.e., the second predetermined width) with which the maximum reflectance for red light occurs. Therefore, in the present invention, the width of the transmissive insulating film is set to be the first predetermined width or more, and the second predetermined width or less.

As a result, in the liquid crystal device of the present invention, external light is reflected to the inside of the first substrate (i.e., the side adjacent to the liquid crystal), decreasing parallax in a display image by an amount corresponding to a decrease in length of the optical path, and improving the brightness of the display image as compared with a conventional reflective liquid crystal device in which external light is reflected by a reflector provided on the outer side of the first substrate. This permits a high resolution bright display, and a high resolution color display. Particularly, in order to achieve a high resolution bright reflective display, the reflecting electrode is formed on the first substrate, and the transmissive insulating film having a single-layer structure is formed on the reflecting electrode, thereby simplifying the structure of the multilayer on the first substrate, the whole construction of the device, and the manufacturing process of the device as compared with the above-described conventional technique of alternately laminating a high refractive index film and a low refractive index film on the pixel electrodes serving as reflectors.

Therefore, the prevent invention can realize a liquid crystal device which enables simplification of the construction and manufacturing process of the device, and high-quality bright image display.

In the liquid crystal device in accordance with one aspect of the present invention, the width of the transmissive insulating film is set to a value close to the third predetermined width which is between the first and second predetermined width, rather than the first and second predetermined widthes, with which the reflectance is at a maximum for green light incident on the second substrate side by the multilayer film.

In this aspect, since the width of the transmissive insulating film is set to a value between the first and second predetermined widthes, and near the third predetermined width with which the reflectance is at a maximum for green light incident on the second substrate side by the multilayer film, particularly, the green light for which spectral luminous efficacy is maximum, can be efficiently reflected to display a visually bright image.

In another aspect of the liquid crystal device of the present invention, the refractive index of the transmissive insulating film is 1.5 or less, and the width of the transmissive insulating film is 50 nm to 100 nm.

In this aspect, in order to obtain high reflectance, the transmissive insulating film having a single-layer structure having a refractive index of 1.5 or less and a width of 50 to 100 nm is formed on the reflecting electrode, thereby simplifying the manufacturing process of the multilayer film formed on the first substrate, for obtaining high reflectance.

In a still another aspect of the liquid crystal device of the present invention, the transmissive insulating film includes silicon oxide as a main component.

In this aspect, the transmissive insulating film including silicon oxide as a main component is formed on the reflecting electrode to obtain high reflectance, thereby obtaining high reflectance by a relatively easy manufacturing process at relatively low cost.

In a further aspect of the liquid crystal device of the present invention, the transmissive insulating film contains inorganic oxide particles having an average particle size of 50 nm or less.

In this aspect, the transmissive insulating film contains inorganic oxide particles having an average particle size of 50 nm or less to improve adhesion to the alignment layer formed on the transmissive insulating film, thereby relatively easily manufacturing the liquid crystal device, and improving reliability of the device.

In a still further aspect of the liquid crystal device of the present invention, the reflecting electrode includes aluminum as a main component.

In this aspect, the reflecting electrode including aluminum as a main component is formed on the first substrate to obtain high reflectance, thereby obtaining high reflectance by a relatively easy manufacturing process at relatively low cost.

In a further aspect of the liquid crystal device of the present invention, the reflecting electrode includes a plurality of stripe reflecting electrodes made of a conductive reflecting film, and a plurality of stripe transmissive electrodes made of a conductive transmissive film are further provided on the second substrate so as to cross the stripe reflecting electrodes.

In this aspect, the liquid crystal device is a so-called passive-matrix-driving-system reflective or transflective liquid crystal device in which an electric field is successively applied to the liquid crystal portions at the intersections of the plurality of stripe reflective electrodes on the first substrate and the plurality of stripe transmissive electrodes on the second substrate between the reflecting electrodes and the transmissive electrodes to control the alignment state of each of the liquid crystal portions, thereby controlling the strength of external light reflected by the reflecting electrodes and emitted as display light through each of the liquid crystal portions.

In a further aspect of the liquid crystal device of the present invention, the reflecting electrodes include a plurality of pixel electrodes arranged in a matrix and made of a conductive reflecting film, a two-terminal switching element connected to each of the pixel electrodes is provided on the first substrate, and one of a plurality of scanning lines and a plurality of data lines connected to the two-terminal switching elements is provided on the first substrate, and the other one of the plurality of scanning lines and the plurality of data lines is provided on the second substrate so as to cross the one of the plurality of scanning lines and the plurality of data lines on the first substrate.

In this aspect, the liquid crystal device is a so-called active-matrix-driving-system reflective or transflective liquid crystal device including the two-terminal switching elements, such as TFDs (Thin Film Diode), wherein an electric field is successively applied to the liquid crystal portions of the pixel electrodes between the pixel electrodes on the first substrate and the data lines or scanning lines on the second substrate to control the alignment state of each of the liquid crystal portions, thereby controlling the strength of external light reflected by each of the pixel electrodes and emitted as display light through each of the liquid crystal portions. Particularly, since electric power is supplied to each of the pixel electrodes through the switching element, such as the TFD, or the like, cross-talk between the respective pixel electrodes is decreased, and display of a high-quality image can be achieved.

In the liquid crystal device in a further aspect of the present invention, the reflecting electrodes include a plurality of pixel electrodes arranged in a matrix and made of a conductive reflecting film, and a three-terminal switching element connected to each of the pixel electrodes and a plurality of scanning lines and a plurality of data lines connected to the three-terminal switching elements are further provided on the first substrate.

In this aspect, the liquid crystal device is a so-called active-matrix-driving-system reflective or transflective liquid crystal device including the three-terminal switching elements, such as TFTs (Thin Film Transistor), wherein an electric field is successively applied to the liquid crystal portions of the pixel electrodes on the first substrate to control the alignment state of each of the liquid crystal portions, thereby controlling the strength of external light reflected by each of the pixel electrodes and emitted as display light through each of the liquid crystal portions. Particularly, since electric power is supplied to each of the pixel electrodes through the three-terminal switching element, such as the TFT, or the like, cross-talk between the respective pixel electrodes is decreased, and display of a high-quality image can be achieved. Counter electrodes made of a conductive transmissive film may be further provided on the second substrate opposite to the pixel electrodes so that the liquid crystal portion of each of the pixel electrodes is driven by a vertical electric field perpendicular to the first substrate, or the liquid crystal portion may be driven by a lateral electric field parallel to the first substrate without the counter electrodes.

In order to solve the above problem, electronic equipment of the present invention includes the above-described liquid crystal device of the present invention.

Therefore, in accordance with the electronic equipment of the present invention including the liquid crystal device of the present invention, it is possible to simplify the construction of the device and the manufacturing process thereof, and realize various electronic equipment, such as a portable telephone, a wristwatch, an electronic notebook, a notebook-type personal computer, etc., which are capable of displaying high-quality images.

The operations and other advantages of the present invention will be made clear from the embodiments described below.

DETAILED DESCRIPTION OF PREFERRED EMBODIMENTS

Figure 1:
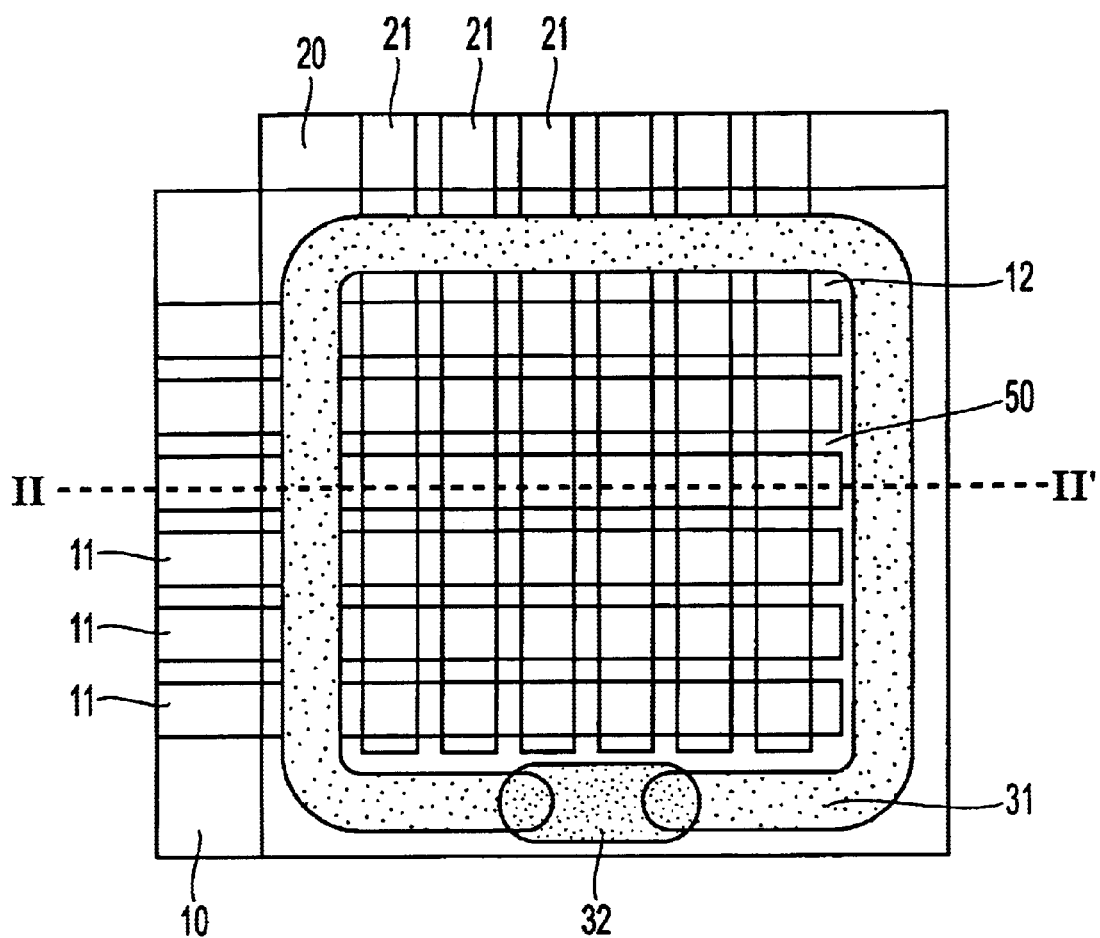
FIG. 1 is a schematic plan view as viewed from the counter substrate side, showing a passive-matrix-driving-system reflective liquid crystal device according to a first embodiment of the present invention in a state where a color filter formed on a counter substrate is removed for the sake of convenience.
Figure 2:
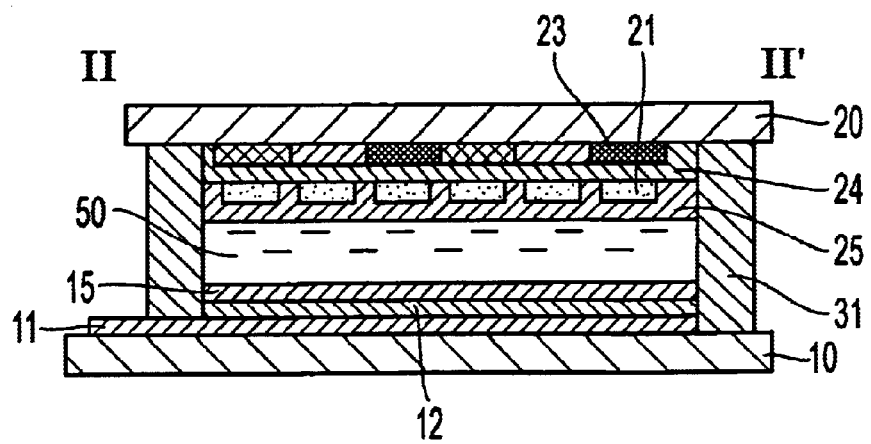
FIG. 2 is a schematic sectional view of the reflective liquid crystal device including the color filter taken along line II–II' of FIG. 1.

The configuration of a liquid crystal device in accordance with a first embodiment of the present invention is described with reference to FIGS. 1 and 2. In the first embodiment, the present invention is applied to a passive-matrix-driving-system reflective liquid crystal device. FIG. 1 is a schematic plan view showing the reflective liquid crystal device, as viewed from the counter substrate, in a state where a color filter formed on a counter substrate is removed for the sake of convenience, and FIG. 2 is a schematic sectional view of the reflective liquid crystal device including the color filter taken along line II–II' of FIG. 1. Although FIG. 1 schematically shows six stripe electrodes in each of the longitudinal and transverse directions for the sake of convenience of description, many electrodes are actually present. In FIG. 2, layers and members are shown to different scales in order to show each of the layers and members in a recognizable size.

Referring to FIGS. 1 and 2, the reflective liquid crystal device of the first embodiment includes a first substrate 10, a transmissive second substrate 20 arranged opposite to the first substrate 10, a liquid crystal layer 50 held between the first substrate 10 and the second substrate 20, a plurality of stripe reflecting electrodes 11 arranged on the side (i.e., the upper surface shown in FIG. 2) of the first substrate 10 which is opposite to the second substrate 20, a transmissive insulating film 12 arranged on the reflecting electrodes 11 and having a single layer structure, and an alignment layer 15 arranged on the transmissive insulating film 12. The reflective liquid crystal device further includes a color filter 23 arranged on the side (i.e., the lower surface shown in FIG. 2) of the second substrate 20, which is opposite to the first substrate 10, a color-filter planarizing film 24 arranged on the color filter 23, a plurality of stripe transmissive electrodes 21 arranged on the color-filter planarizing film 24 so as to cross the reflective electrodes 11, and an alignment layer 25 arranged on the transmissive electrodes 21. The first substrate 10 and the second substrate 20 are combined by a sealing material 31 provided in the periphery of the liquid crystal layer 50 so that the liquid crystal layer 50 is sealed between the first substrate 10 and the second substrate 20 by the sealing material 31 and a sealant 32.

The first substrate 10 may be either transmissive or opaque, and thus includes, for example, a quartz substrate or a semiconductor substrate. The second substrate 20 is required to be transmissive or at least translucent for visible light, and includes, for example, a glass substrate or quartz substrate.

The reflecting electrodes 11 include a conductive reflecting film composed of, for example, aluminum as a main component, and is formed by vacuum evaporation, or the like. The transmissive electrodes 21 includes a transmissive conductive thin film, such as an ITO (Indium Tin Oxide) film.

Each of the alignment layers 15 and 25 includes an organic thin film, such as a polyimide thin film, or the like, and is formed by spin coating and is then subjected to predetermined alignment processing, such as rubbing, or the like.

The liquid crystal layer 50 takes a predetermined alignment state by the alignment layers 15 and 25 with no electric field applied between the reflective electrodes 11 and the transmissive electrodes 21. For example, the liquid crystal layer 50 includes a single nematic liquid crystal or a mixture of several types of nematic liquid crystals.

The sealing material 31 includes an adhesive composed of, for example, a photocurable resin or thermosetting resin. Particularly, in the case of small reflective liquid crystal devices having a diagonal size of about several inches or less, the sealing material 31 contains a gap material (spacer), such as glass fibers or glass beads in order to obtain the predetermined gap between both substrates. However, in the case of large reflective liquid crystal devices having a diagonal size of about several inches to 10 inches, such a gap material may be mixed in the liquid crystal layer 50. The sealant 32 includes a resin adhesive or the like for sealing an injection port of the sealing material 31 after the liquid crystal is injected under vacuum through the injection port.

The color filter 23 is a known color filter in a delta arrangement, stripe arrangement, mosaic arrangement, triangle arrangement, or the like, in which coloring material films which respectively transmit blue light, green light and red light are formed in respective pixels, and a light-shielding film referred to as a black mask or a black matrix is formed in the boundaries between the respective pixels so as to prevent color mixing between the respective pixels. Although not shown in FIGS. 1 and 2, a light-shielding film including the same material as or a different material from the light-shielding film in the color filter 23 may be provided as a frame for defining the periphery of the image display region. Alternatively, such a frame may be defined by the edge of a light-shielding case for containing the reflective liquid crystal device.

Particularly, in the first embodiment, the refractive index of the transmissive insulating film 12 is set to be lower than the refractive index of the liquid crystal which forms the liquid crystal layer 50 and the refractive index of the alignment layer 15. Furthermore, the width of the transmissive insulating film 12 is set to be not less than a first predetermined width with which the reflectance of the multilayer film including the reflecting electrodes 11, the transmissive insulating film 12, and the alignment layer 15 is at a maximum for blue light incident on the second substrate 20 side, and not more than a second predetermined width with which the reflectance of the multilayer film including the reflecting electrodes 11, the transmissive insulating film 12, and the alignment layer 15 is at a maximum for red light incident on the second substrate 20 side.

In order to satisfy the above conditions, for example, the transmissive insulating film 12 includes silicon oxide as a main component, and the refractive index of the transmissive insulating film 12 is 1.5 or less, while the refractive index of the liquid crystal is 1.60, and the refractive index of the alignment layer 15 is 1.66. The transmissive insulating film 12 is formed by sputtering, for example, so that the width is 50 to 100 nm.

Description will now be made of simulation for determining the relation between the refractive index of the transmissive insulating film 12 and the external light reflectance of the multilayer film including the reflecting electrodes 11, the transmissive insulating film 12, and the alignment layer 15, and the relation between the width of the transmissive insulating film 12 and the reflectance in a system where the multilayer film contacts the liquid crystal layer 50.

Simulation is carried out as follows:

The refractive index n* of an absorber, such as a metallic film, a semiconductor film, or the like, is generally represented by a complex number as shown by the following equation:

$$n^* = n - ik$$

wherein n and k are optical constants of the absorber.

Figure 3:
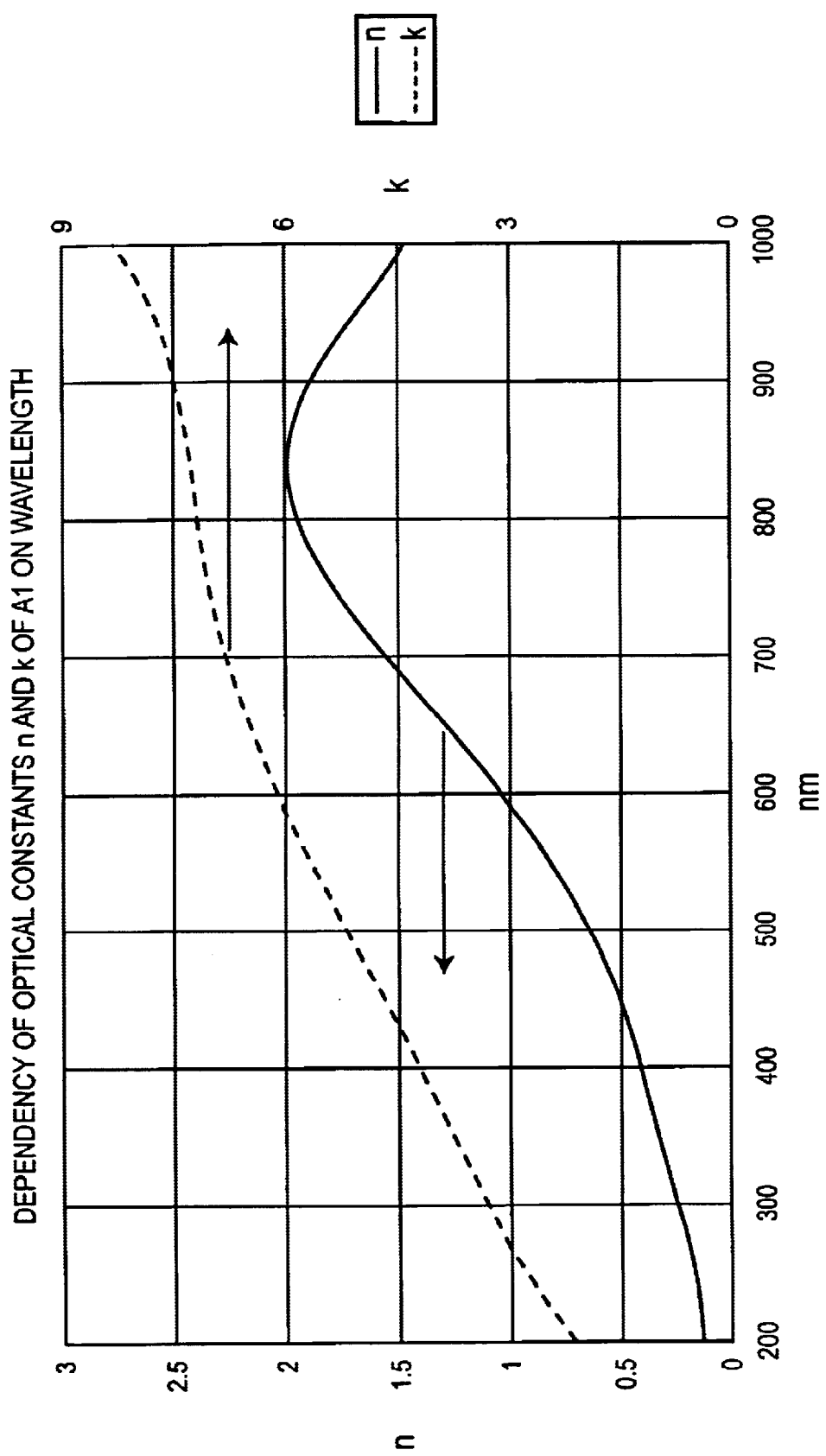
FIG. 3 is a characteristic diagram showing an example of charts for determining optical constants n and k of aluminum used for forming reflecting electrodes in the first embodiment.

These optical constants n and k are inherent to each absorber and are dependent on wavelength. The optical constants also vary with deposition conditions. Therefore, if an absorber and deposition conditions therefor are determined, the constants can be directly determined by experience, experiment or simulation. FIG. 3 shows an example of charts for determining the optical constants n and k of aluminum used for forming the reflecting electrodes 11 in the first embodiment.

In FIG. 3, the wavelength (nm) of light is shown on the abscissa, and the optical constants n (left side) and k (right side) are shown on the ordinate. In FIG. 3, the dependency of the optical constant n on wavelength is shown by a solid line, and the dependency of the optical constant k on wavelength is shown by a dashed line. Therefore, for aluminum, for example, at a wavelength 650 nm (red light), it is determined from the intersection of the solid line and the wavelength of 650 nm that n=1.3, as shown by an arrow in the chart. For example, at a wavelength 700 nm, it is determined from the intersection of the dashed line and the wavelength of 700 nm that k=6.8, as shown by an arrow in the chart. In this way, optical constants n and k for the wavelength of any desired light can be simply determined by using the chart shown in FIG. 3.

In the system of this embodiment in which the multilayer film including the reflecting electrodes 11, the transmissive insulating film 12, and the alignment layer 15 contacts the liquid crystal layer 50, the optical constants of the reflecting electrodes 11 (absorber) are n and k, the refractive index and width of the transmissive insulating film 12 (dielectric) are $n_2$ and $d_2$, respectively, the refractive index and width of the alignment layer 15 (dielectric) are $n_1$ and $d_1$, respectively, and the refractive index of the liquid crystal (medium) of the liquid crystal layer 50 is $n_o$, and an amplitude reflectance r is represented by the following equation:

$$r=(r_1+r_2 e^{-i\theta_1}+r_3 e^{-i(\theta_1+\theta_2)}+r_1 r_2 r_3 e^{-i\theta_2})/(1+r_1 r_2 e^{-i\theta_1}+r_1 r_3 e^{-i(\theta_1-\theta_2)}+r_2 r_3 e^{-i\theta_2})$$

wherein $r_1=(n_1-n_0)/(n_1+n_0)$,
$r_2=(n_2-n_1)/(n_2+n_1)$,
$r_3=(n-n_2-ik)/(n+n_2-ik)$,
$\theta_1=4\pi n_1 d_1/\lambda$, and
$\theta_2=4\pi n_2 d_2/\lambda$.

Therefore, $r_1$, $r_2$ and $r_3$ are substituted in the amplitude reflectance r, and the terms of each of the numerator and denominator are rearranged into real terms and imaginary terms, and multiplied by its complex conjugate to obtain energy reflectance R (=reflectance).

Figure 4:
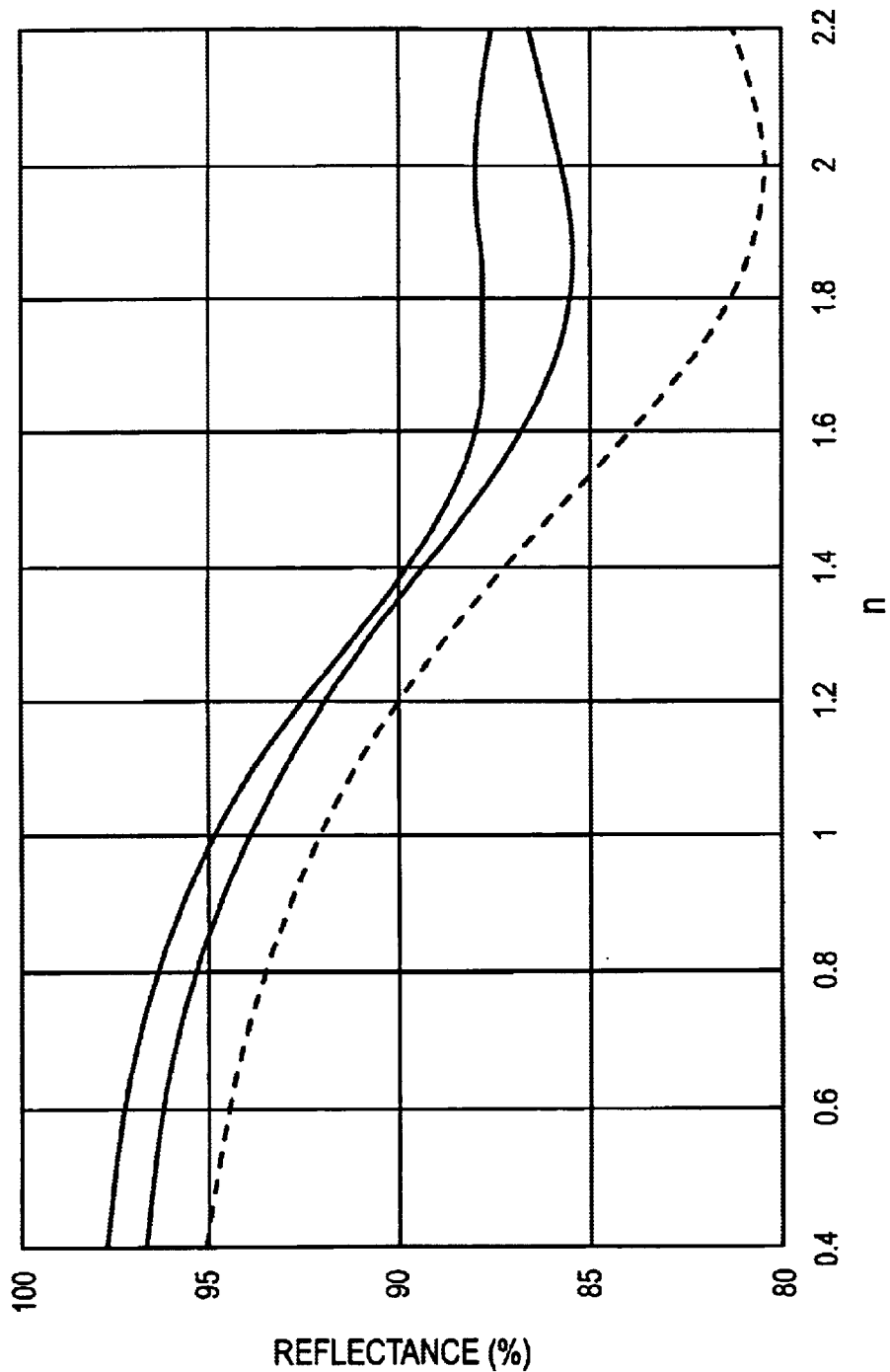
FIG. 4 is a characteristic diagram showing the relation between the reflectance of a multilayer film including a reflecting electrode, a transmissive insulating film, and an alignment layer in contact with a liquid crystal layer and the refractive index of the transmissive insulating film, which is obtained by simulation in the first embodiment.

FIG. 4 shows the relation between the reflectance (R) of the multilayer film including the reflecting electrodes 11, the transmissive insulating film 12, and the alignment layer 15 in contact with the liquid crystal layer 50, and the refractive index ($n_2$) of the transmissive insulating film 12, which was obtained by the above-mentioned simulation. In this simulation, the width ($d_2$) of the transmissive insulating film 12 is 100 nm.

FIG. 4 indicates that as the refractive index of the transmissive insulating film 12 decreases to a value lower than the refractive index of the liquid crystal, which constitutes the liquid crystal layer 50 and the refractive index of the alignment layer 15, the reflectance of the multilayer film including the reflecting electrodes 11, the transmissive insulating film 12, and the alignment layer 15 increases for blue light (wavelength=450 nm, the characteristic curve shown by a black line in FIG. 4), red light (wavelength=650 nm, the characteristic curve shown by a broken line in FIG. 4), and green light (wavelength=550 nm, the characteristic curve shown by a gray line in FIG. 4). These characteristic curves reveal that in this embodiment, as the refractive index of the transmissive insulating film 12 decreases, the reflectance of the multilayer film increases, and for example, when n=1.2 or less, a reflectance of about 90% can be obtained, with red light exhibiting the lowest reflectance. However, when the refractive index of the transmissive insulating film 12 is 1.5 or less, a reflectance of 85% or more can be secured, with red light exhibiting the lowest reflectance. Particularly, with a refractive index of about 1.30 to 1.45, production is easy, and a reflectance close to 90% can be obtained with, red light exhibiting the lowest reflectance, thereby providing advantages for practical use.

Although, in this case, the width of the transmissive insulating film 12 is 100 nm, changing the width of the transmissive insulating film 12 in the range of 50 nm to 200 nm causes the same tendency as described above. Namely, when the refractive index of the transmissive insulating film 12 is set to 1.5 or less, a reflectance of about 80% or more can be secured, with red light exhibiting the lowest reflectance.

Figure 5:
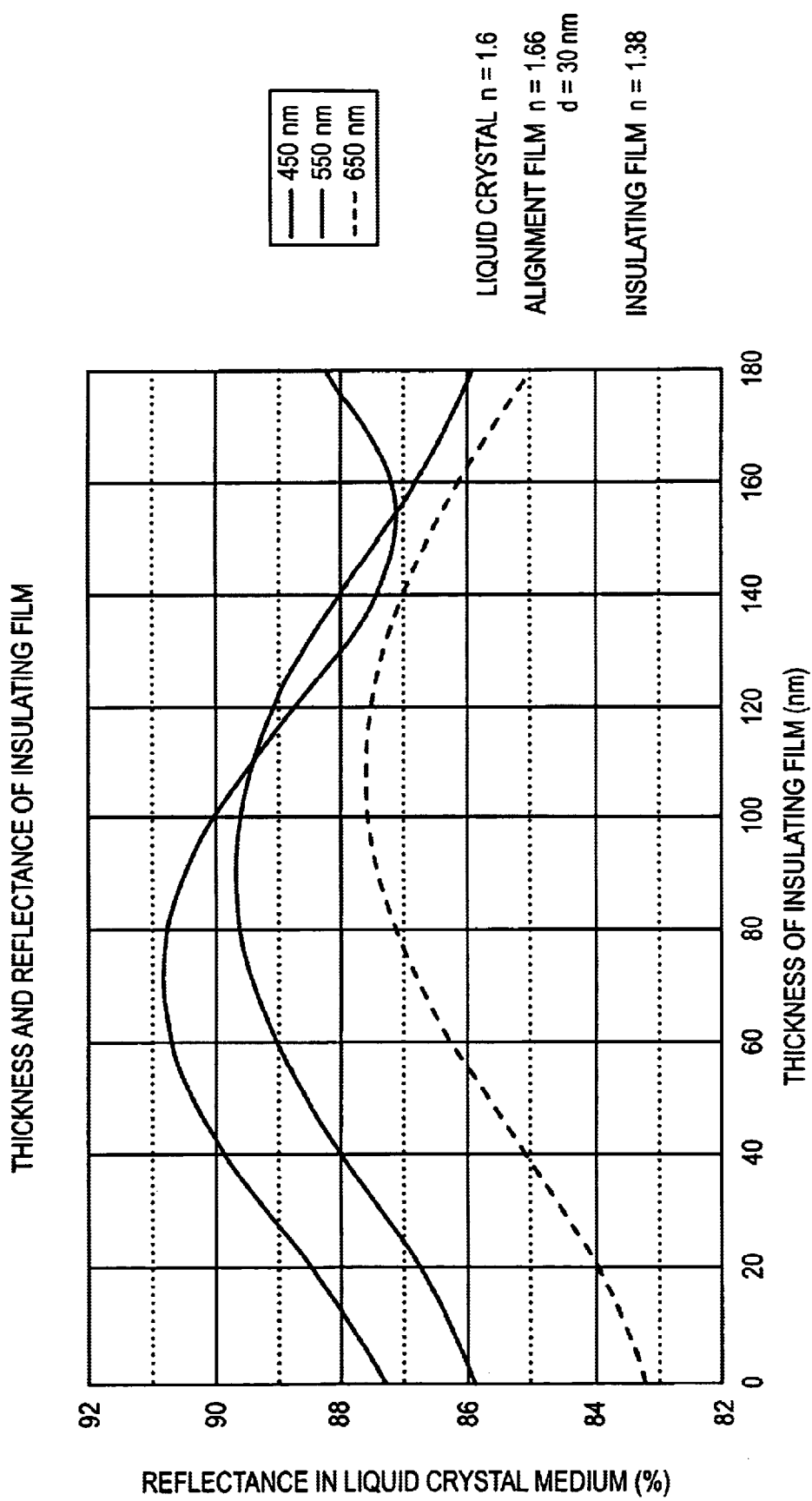
FIG. 5 is a characteristic diagram showing an example of the relation between the reflectance of a multilayer film including a reflecting electrode, a transmissive insulating film, and an alignment layer in contact with a liquid crystal layer and the width of the transmissive insulating film, which is obtained by simulation in the first embodiment.
Figure 6:
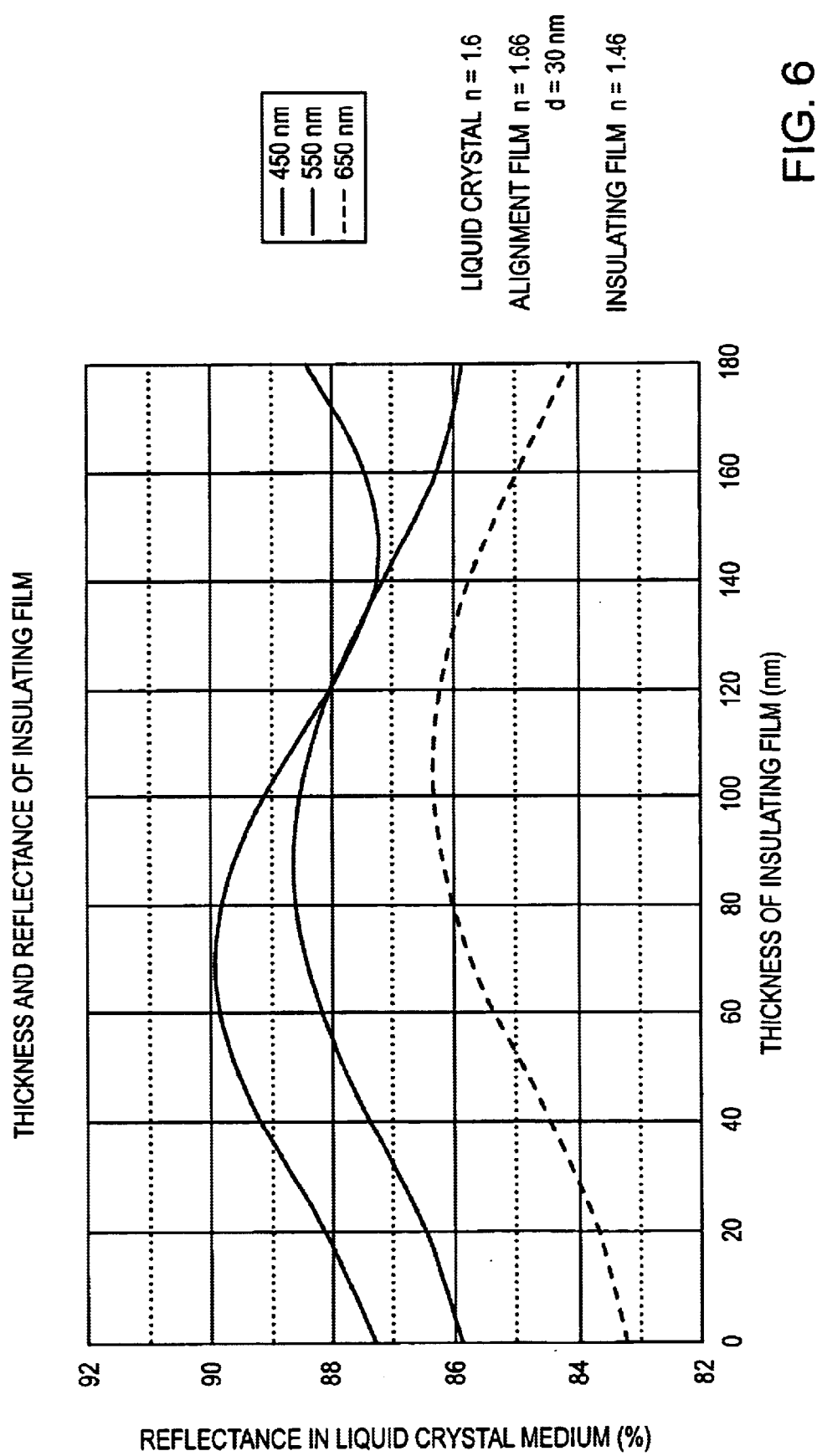
FIG. 6 is a characteristic diagram showing another example of the relation between the reflectance of a multilayer film including a reflecting electrode, a transmissive insulating film, and an alignment layer in contact with a liquid crystal layer and the width of the transmissive insulating film, which is obtained by simulation in the first embodiment.
Figure 7:
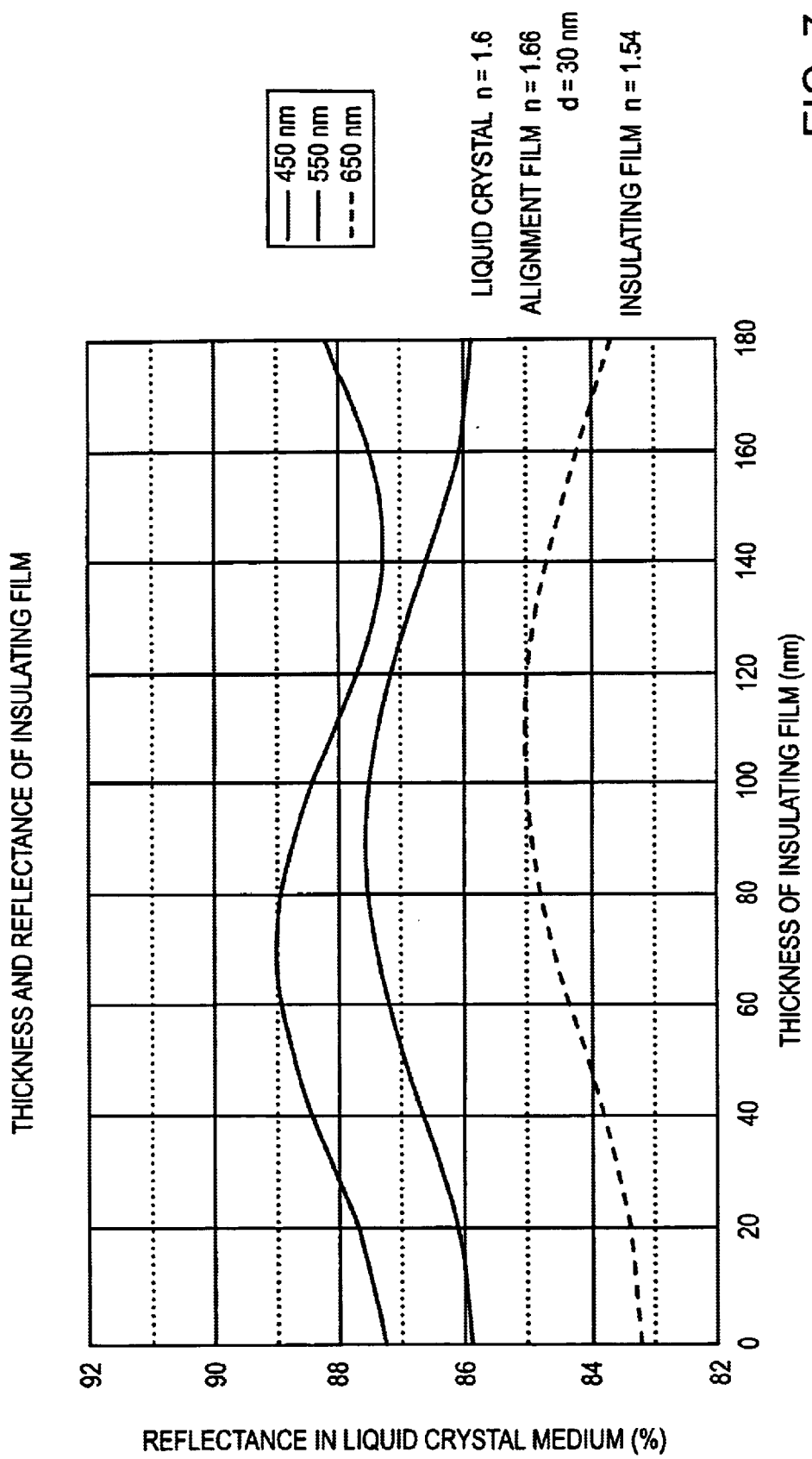
FIG. 7 is a characteristic diagram showing a further example of the relation between the reflectance of a multilayer film including a reflecting electrode, a transmissive insulating film, and an alignment layer in contact with a liquid crystal layer and the width of the transmissive insulating film, which is obtained by simulation in the first embodiment.

FIGS. 5 to 7 show examples of the relation between the reflectance (R) of the multilayer film including the reflecting electrodes 11, the transmissive insulating film 12, and the alignment layer 15 in contact with the liquid crystal layer 50, and the width ($d_2$) of the transmissive insulating film 12, which were obtained by the above simulation.

In the simulation of the example shown in FIG. 5, the refractive index of the liquid crystal is 1.60, the refractive index of the alignment layer 15 is 1.66, the refractive index of the transmissive insulating film 12 is 1.38, and the width of the alignment layer 15 is 30 nm.

FIG. 5 indicates that with the transmissive insulating film 12 having a width of about 70 nm, a maximum reflectance is observed for blue light (wavelength=450 nm, the characteristic curve shown by a black line in FIG. 5). With the transmissive insulating film 12 having a width of about 90 nm, a maximum reflectance is observed for green light (wavelength=550 nm, the characteristic curve shown by a gray line in FIG. 5). With the transmissive insulating film 12 having a width of about 110 nm, a maximum reflectance is observed for red light (wavelength=650 nm, the characteristic curve shown by a broken line in FIG. 5).

In the simulation in the example shown in FIG. 6, the conditions are the same as the example shown in FIG. 5 except that the refractive index of the transmissive insulating film 12 is 1.46.

FIG. 6 indicates that although the reflectance is decreased by an amount corresponding to a decrease in refractive index of the transmissive insulating film 12, as compared with the example shown in FIG. 5, the maximum reflectance for each color light has the same tendency as the example shown in FIG. 5. Namely, with the transmissive insulating film 12 having a width of about 70 nm, a maximum reflectance is observed for blue light (wavelength=450 nm, the characteristic curve shown by a black line in FIG. 6). With the transmissive insulating film 12 having a width of about 90 nm, a maximum reflectance is observed for green light (wavelength=550 nm, the characteristic curve shown by a gray line in FIG. 6). With the transmissive insulating film 12 having a width of about 110 nm, a maximum reflectance is observed for red light (wavelength=650 nm, the characteristic curve shown by a broken line in FIG. 6).

In the simulation in the example shown in FIG. 7, the conditions are the same as the example shown in FIG. 5 or 6 except that the refractive index of the transmissive insulating film 12 is 1.54.

FIG. 7 indicates that although the reflectance is further decreased by an amount corresponding to a decrease in refractive index of the transmissive insulating film 12, as compared with the example shown in FIG. 5 or 6, the maximum for each color light has the same tendency as the example shown in FIG. 5 or 6. Namely, with the transmissive insulating film 12 having a width of about 70 nm, a maximum reflectance is observed for blue light (wavelength=450 nm, the characteristic curve shown by a black line in FIG. 7). With the transmissive insulating film 12 having a width of about 90 nm, a maximum reflectance is observed for green light (wavelength=550 nm, the characteristic curve shown by a gray line in FIG. 7). With the transmissive insulating film 12 having a width of about 110 nm, a maximum reflectance is observed for red light (wavelength=650 nm, the characteristic curve shown by a broken line in FIG. 7).

As described above, the maximum reflectance for green light occurs when the width of the transmissive insulating film 12 is a width (about 90 nm) between a relatively small width (about 70 nm) with which the maximum for blue light appears, and a relatively large width (about 110 nm) with which the maximum for red light appears. Namely, the width of the transmissive insulating film 12 which causes the maximum reflectance for each color light increases in the order of blue light, green light and red light. Therefore, in order to increase the reflectance for light of these three colors which usually form external white light, the width of the transmissive insulating film 12 is preferably set to a width between a width (for example, about 70 nm) with which the maximum for blue light appears, and a width (for example, about 110 nm) with which the maximum for red light appears. In the first embodiment, therefore, the width of the transmissive insulating film 12 is set to a value of about 70 nm to about 110 nm.

Such a width of the transmissive insulating film 12 is preferably set to a value near a third predetermined width (for example, about 90 nm) with which the maximum for green light appears. Such setting permits the efficient reflection of a green light for which spectral luminous efficacy is maximum while maintaining high reflectance for blue light and red light, thereby enabling the display of visually bright images.

On the basis of the above-described results, in the first embodiment, the refractive index (for example, 1.5 or less) of the transmissive insulating film 12 is set to a value lower than the refractive index (for example, 1.6) of the liquid crystal which constitutes the liquid crystal layer 50 and the refractive index (for example, 1.66) of the alignment layer 15. The width of the transmissive insulating film 12 is set to be not less than the first predetermined width (for example, 70 nm) with which the reflectance of the multilayer film including the reflecting electrodes 11, the transmissive insulating film 12, and the alignment layer 15 is at a maximum for blue light incident on the second substrate 20 side, and not more than the second predetermined width (for example, 110 nm) with which the reflectance is at a maximum for red light incident on the second substrate 20 side. Therefore, the external light reflectance of the multilayer film including the reflecting electrodes 11, the transmissive insulating film 12, and the alignment layer 15 in contact with the liquid crystal layer 50 can be set to a high value. Furthermore, unlike a conventional reflective liquid crystal device in which external light is reflected by a reflector provided on the outer side of a first substrate, external light is reflected by the multilayer film including the reflecting electrodes 11, the transmissive insulating film 12, and the alignment layer 15 provided on the upper side of the first substrate 10, thereby decreasing parallax in a display image corresponding to a decrease in the optical path, and improving brightness of the display image. As a result, a bright, high-resolution, reflective display is possible, and high-definition color display is also possible.

If only the reflecting electrodes 11 and the alignment layer 15 are formed on the first substrate 10 without the transmissive insulating film 12, particularly, when a conductive foreign material larger than the gap material (spacer) contained in the liquid crystal layer 50 or the sealing material 31 is mixed in the liquid crystal layer 50, there is a high probability of short circuiting the reflecting electrodes 11 and the transmissive electrodes 21 due to breakage of the alignment layers 15 and 25, i.e., causing defects in the device. However, in the first embodiment, the probability of the occurrence of such device defects can be significantly decreased by the presence of the transmissive insulating film 12 having higher strength than the alignment layer 15, or the cooperation of the alignment layer 15 and the transmissive insulating film 12.

Particularly, in order to achieve a bright, high-resolution, reflective display, and to improve the ratio of defects in the device, the transmissive insulating film 12 having a single-layer structure is preferably formed on the reflecting electrodes 11, thereby simplifying the structure of the multilayer film on the first substrate 10, and the whole structure of the device, as compared with the above-described conventional technique of alternately laminating a high-refractive index layer and a low-refractive index layer on pixel electrodes serving as reflectors.

As described above, in the first embodiment, since the transmissive insulating film 12 includes silicon oxide as a main component, and the reflecting electrodes 11 include aluminum as a main component, high reflectance can be obtained by a relatively simple manufacturing process at relatively low cost. However, even when the transmissive insulating film 12 includes silicon nitride as a main component, and the reflecting electrodes 11 include another metal, such as silver, chromium, or the like, the above-described effect of the first embodiment can be more or less obtained.

In the above first embodiment, the transmissive insulating film 12 preferably contains inorganic oxide particles having an average particle size of 50 nm or less. This improves the adhesion to the alignment layer 15 formed on the transmissive insulating film 12, permitting relatively easy manufacturing of the reflective liquid crystal device and improving reliability of the device. For example, such inorganic oxide particles include silicon oxide particles, aluminum oxide particles, tin oxide particles, etc., and can be relatively easily contained in the silicon oxide film by a solgel method.

In the above first embodiment, a driving LSI chip mounted on, for example, a TAB (Tape Automated Bonding) substrate and including a data line driving circuit and a scanning line driving circuit may be electrically and mechanically connected via an anisotropic conductive film to the terminals of the reflecting electrodes 11, which are led to the terminal region on the first substrate 10, and the terminals of the transmissive electrodes 21, which are led to the terminal region on the second substrate 20, to supply image signals and scanning signals to the reflecting electrodes 11 and the transmissive electrodes 21 with predetermined timing. Alternatively, such data line driving circuit and scanning line driving circuit may be formed in a peripheral region on the first substrate 10 or second substrate 20 outside the sealing material 31 to form a so-called built-in driving-circuit-type reflective liquid crystal device, or an inspection circuit is formed for inspecting the quality, defects, etc., of the liquid crystal device during manufacturing and shipment to form a so-called built-in peripheral-circuit-type reflective liquid crystal device.

In addition, on the side of the second substrate 20 where external light is incident and emitted, for example, a polarization film, a retardation film, a polarizer, or the like, is arranged in a predetermined direction according to the operation mode, such as TN (Twisted Nematic) mode, VA (Vertically Aligned) mode, PDLC (Polymer Dispersed Liquid Crystal) mode, or the like, and normally-white mode or normally-black mode. Also a micro-lens may be formed on the second substrate 20 in correspondence with each of the pixels. This improves the condensing efficiency of incident light, and can thus realize a bright liquid crystal device. Furthermore, a dichroic filter may be formed on the second substrate 20, in which many interference layers having different refractive indexes are deposited to create RGB colors by using interference of light. A counter substrate with dichroic filter can realize a brighter color liquid crystal device.

The operation of the reflective liquid crystal device of the first embodiment having the above-described construction will be described below with reference to FIG. 2.

In FIG. 2, external light incident on the second substrate 20 side passes through the transmissive second substrate 20 and the liquid crystal layer 50, and is reflected by the multilayer film including the reflecting electrodes 11, the transmissive insulating film 12, and the alignment layer 15 provided on the first substrate 10, and is emitted from the second substrate 20 side through the liquid crystal layer 50 and the transmissive second substrate 20. Therefore, when an image signal and scanning signal are supplied to the reflecting electrodes 11 and the transmissive electrodes 21 from external circuits with the predetermined timing, an electric field is successively applied to the portions of the liquid crystal layer 50 at the intersections of the reflecting electrodes 11 and the transmissive electrodes 21 for each line, column or pixel. For example, by arranging a polarizer on the outer side of the transmissive second substrate 20, external light can be modulated by controlling the alignment state of the liquid crystal layer 50 for each pixel unit by the reflecting electrodes 11, thereby permitting gray-scale display. In the normally-white mode, incident light cannot be transmitted through the liquid crystal portions according to the applied voltage, while in the normally-black mode, incident light can be transmitted through the liquid crystal portions according to the applied voltage. As a whole, reflected light having a contrast corresponding to the image signal is emitted from the reflective liquid crystal device.

As a result, in the reflective liquid crystal device of the first embodiment, external light incident on the second substrate 20 side passes through the liquid crystal layer, and is reflected by the multilayer film including the reflecting electrodes 11, the transmissive insulating film 12, and the alignment layer 15, and is emitted as display light through the liquid crystal layer 50, thereby enabling bright image display with less parallax by using external light.

A liquid crystal device in accordance with a second embodiment of the present invention will be described with reference to FIGS. 8 to 11. In the second embodiment, the present invention is applied to a TFD active-matrix-driving-system reflective liquid crystal device.

Figure 8:
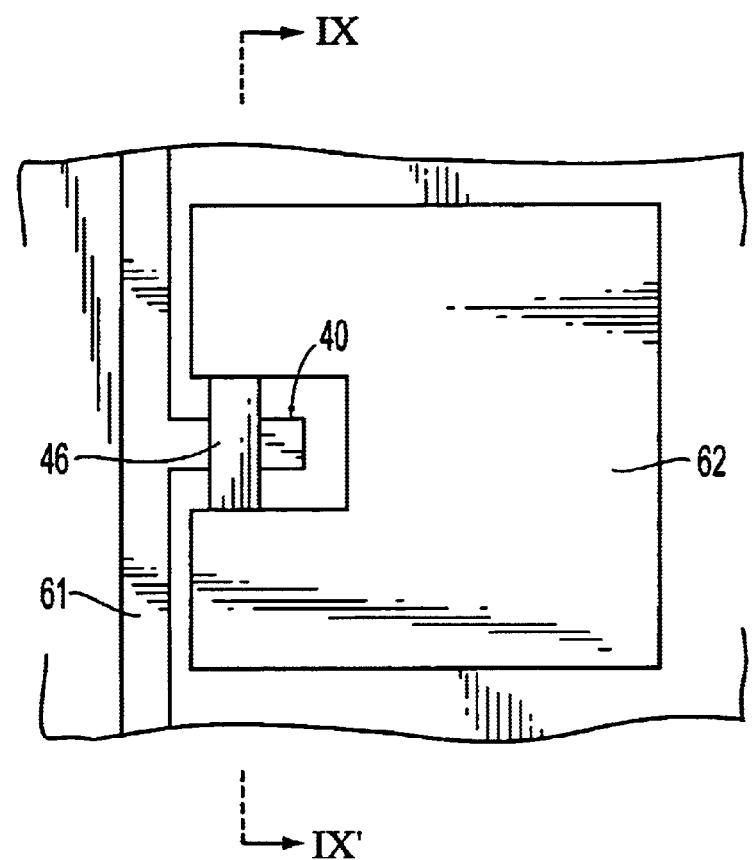
FIG. 8 is a plan view schematically showing a TFD driving element together with a pixel electrode used in a TFD active-matrix-driving-system reflective liquid crystal device according to a second embodiment of the present invention.
Figure 9:
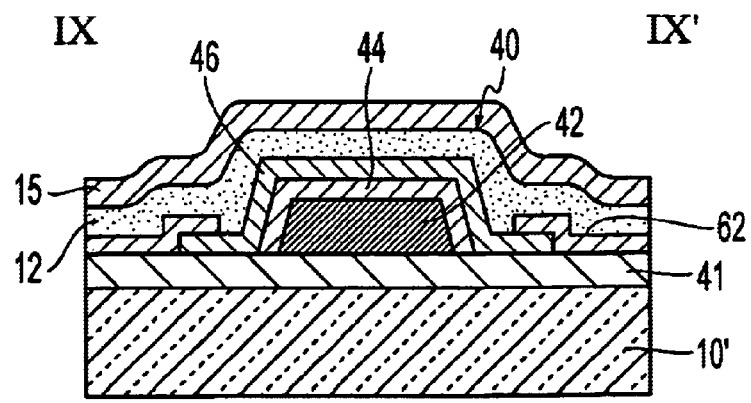
FIG. 9 is a sectional view taken along line IX–IX' of FIG. 8.

The configuration near a TFD driving element as an example of a two-terminal nonlinear element used in this embodiment is described with reference to FIGS. 8 and 9. FIG. 8 is a plan view schematically showing the TFD driving element together with a pixel electrode, etc., and FIG. 9 is a sectional view taken along line IX–IX' of FIG. 8. In FIG. 9, layers and members are shown to different scales in order to show each of the layers and members in a recognizable size in the drawing.

Referring to FIGS. 8 and 9, a TFD driving element 40 is formed on an insulating film 41 formed as a base on a TFD array substrate 10' as another example of the first substrate, and has a TFD (Thin Film Diode) structure or MIM (Metal Insulator Metal) structure including a first metal film 42, an insulating layer 44 and a second metal film 46, which are formed on the insulating film 41 in this order from the insulating film 41. The first metal film 42 of the TFD driving element 40 is connected to a scanning line 61 formed on the TFD array substrate 10', and the second metal film 46 is connected to a pixel electrode 62 including a conductive reflecting film as another example of the reflecting electrodes. Instead of the scanning line 61, a data line (which will be describe below) may be formed on the TFD array substrate 10', connected to the pixel electrode 62, and the scanning line 61 may be provided on the counter substrate side.

The TFD array substrate 10' includes an insulating transmissive substrate, for example, such as a glass substrate, a plastic substrate, or the like, or an opaque semiconductor substrate. The insulating film 41 serving as a base includes, for example, tantalum oxide. However, the insulating film 41 is mainly formed for preventing separation of the first metal film 42 from the base and diffusion of impurities into the first metal film 42 from the base in heat treatment after the second metal film 46 is deposited. Therefore, when the TFD array substrate 10' includes a substrate having excellent heat resistance and purity, for example, such as a quartz substrate, or the like, and thus has no problem of separation or impurity diffusion, the insulating film 41 can be omitted. The first metal film 42 includes a conductive metal thin film made of, for example, a single tantalum material or tantalum alloy. The insulating layer 44 includes, for example, an oxide film formed on the surface of the first metal film 42 by anodic oxidation in a chemical solution. The second metal film 46 includes a conductive metal film made of, for example, single chromium material or chromium alloy.

Particularly, in this embodiment, like the reflecting electrodes 11 in the first embodiment, the pixel electrode 62 includes a conductive reflecting film composed of aluminum as a main component, and is formed by vacuum evaporation. Namely, the pixel electrode 62 functions as a pixel electrode serving as a reflector in the reflection liquid crystal device.

In addition, like in the first embodiment, a transmissive insulating film 12 is provided on the sides (the upper surfaces shown in FIG. 9) of the pixel electrode 62, the TFD driving element 40, the scanning line 61, etc., and an alignment layer 15 including an organic film, such as, for example, a polyimide thin film, or the like, and subjected to predetermined alignment processing, such as rubbing is provided on the transmissive insulating film 12.

Although some examples of the TFD driving element 40 as a two-terminal nonlinear element are described above, two-terminal nonlinear elements having bidirectional diode characteristics, such as a ZnO (zinc oxide) varistor, a MSI (Metal Semi-Insulator) driving element, a RD (Ring Diode), and the like, can be applied to the reflective liquid crystal device of this embodiment.

Figure 10:
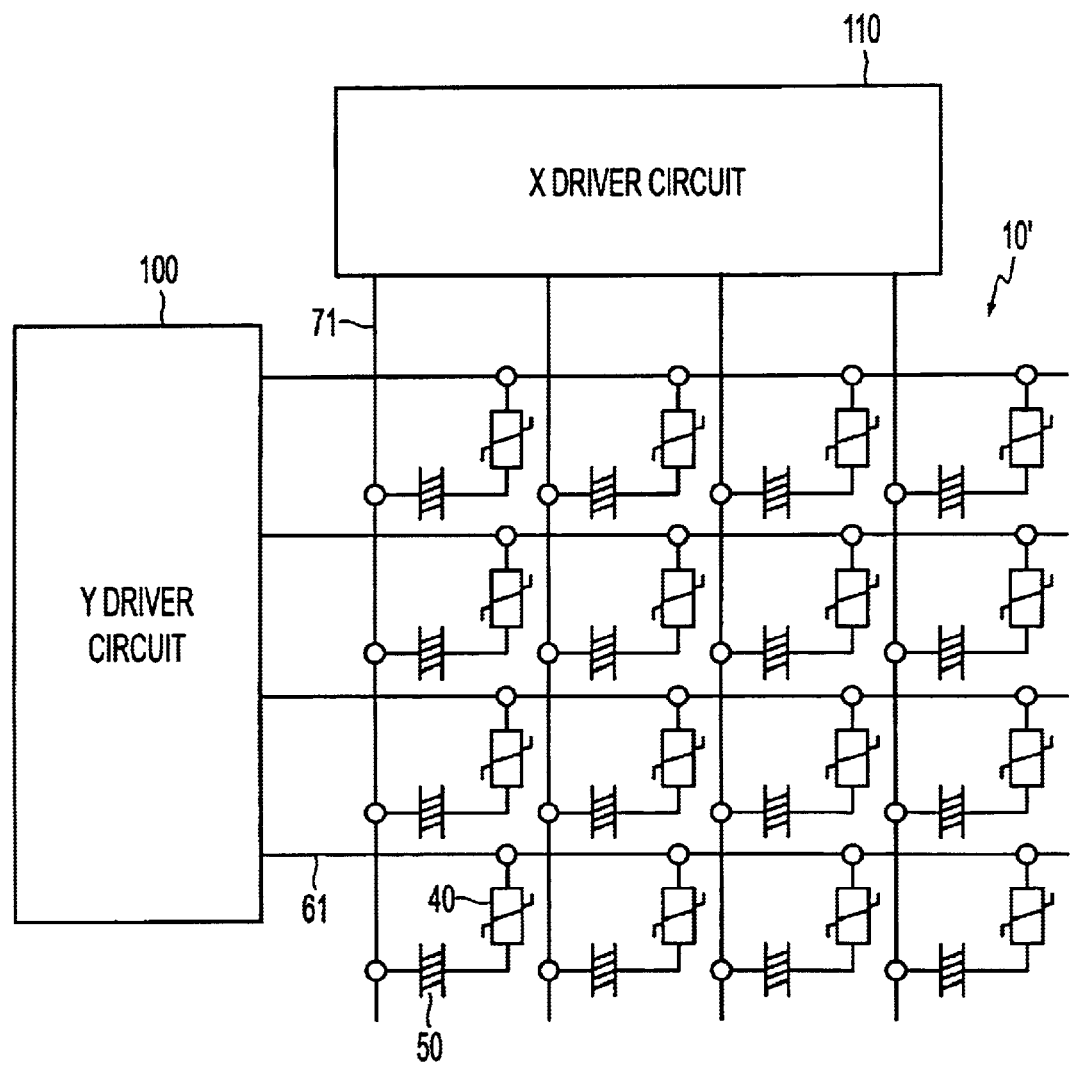
FIG. 10 is a drawing showing equivalent circuits of the pixel region together with peripheral driving circuits in the reflective liquid crystal device according to the second embodiment.

The construction and operation of the TFD active matrix driving system reflective liquid crystal device of the second embodiment, which includes the TFD driving element having the above construction, will be described below with reference to FIGS. 10 and 11. FIG. 10 is a drawing showing equivalent circuits of a liquid crystal device together with driving circuits, and FIG. 11 is a partially cut-away perspective view schematically showing the liquid crystal device.

Referring to FIG. 10, in the TFD active-matrix-driving-system reflective liquid crystal device, a plurality of scanning lines 61 arranged on the TFD array substrate 10' are connected to a Y driver circuit 100 which constitutes an example of the scanning driving circuit, and a plurality of data lines 71 arranged on the counter substrate are connected to an X driver circuit 110 which constitutes an example of the data line driving circuit. The Y driver circuit 100 and the X driver circuit 110 may be formed on the TFD array substrate 10' or the counter substrate. In this case, a built-in driving-circuit-type liquid crystal device is formed. Each of the Y driver circuit 100 and the X driver circuit 110 may include an external IC independent of the reflective liquid crystal device, and may be connected to the scanning lines 61 or data lines 71 through predetermined wiring. In this case, a reflective liquid crystal device including no driving circuit is formed.

In each of the pixel regions arranged in a matrix, the scanning line 61 is connected to one of the terminals of the TFD driving element 40 (refer to FIGS. 8 and 9), and the data line 71 is connected to the other terminal of the TFD driving element 40 through the liquid crystal layer 50 and the pixel electrode 62. Therefore, when a scanning signal is supplied to the scanning line 61, and a data signal is supplied to the data line 71 corresponding to each of the pixel regions, the TFD driving element 40 of the corresponding pixel region is turned on to apply a driving voltage to the liquid crystal layer 50 between the pixel electrode 62 and the data line 71 through the TFD driving element 40.

Figure 11:
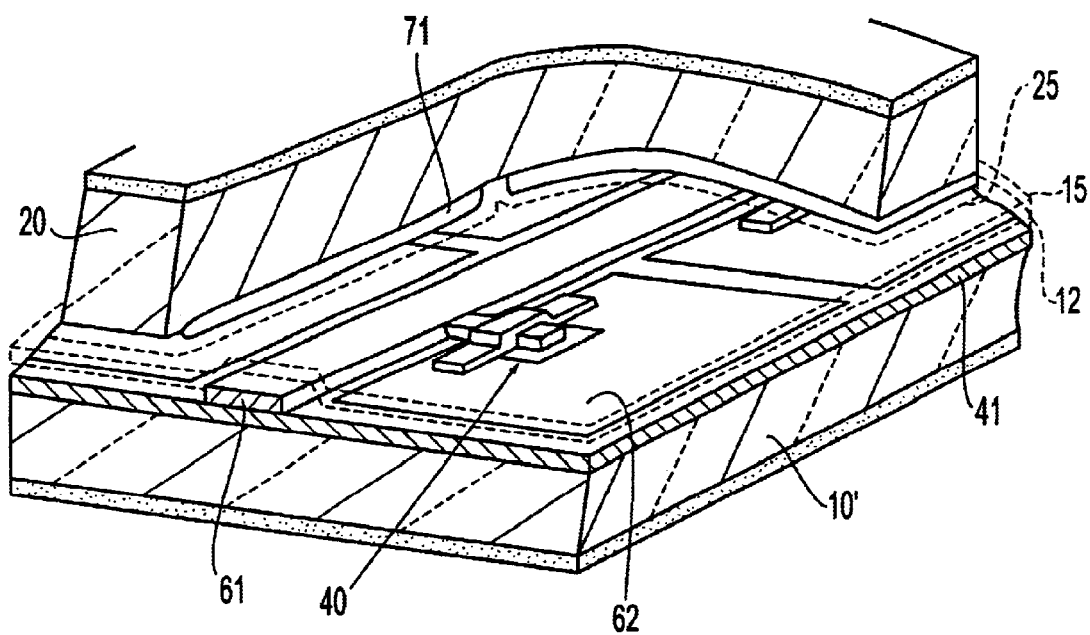
FIG. 11 is a partially cut-away perspective view schematically showing the reflective liquid crystal device according to the second embodiment.

In FIG. 11, the reflective liquid crystal device includes the TFD array substrate 10' and the second substrate (counter substrate) 20 arranged opposite to the TFD array substrate 10'. The second substrate 20 includes, for example, a glass substrate. The TFD array substrate 10' includes pixel electrodes 62 arranged in a matrix and a reflecting film, each of the pixel electrodes 62 being connected to the scanning lines 61.

In this embodiment, particularly, like the transmissive insulating film 12 and the alignment layer 15 of the first embodiment, the transmissive insulating film 12 and the alignment layer 15 are provided on the sides of the pixel electrodes 62, the TFD driving elements 40, the scanning lines 61, etc., which contact the liquid crystal.

On the other hand, a plurality of data lines 71 are provided in a strip arrangement on the second substrate 20 so as to extend in the direction crossing the scanning lines 61. An alignment layer 25 including an organic thin film, for example, such as a polyimide thin film, and subjected to predetermined alignment processing such as rubbing, or the like, is provided below the data lines 71. Furthermore, a color filter (not shown) including coloring material films arranged in a stripe, mosaic, or triangular form is provided on the second substrate 20 according to the application.

Like the stripe transmissive electrodes 21 of the first embodiment, the data lines 71 include a transmissive conductive thin film, such as, for example, an ITO (Indium Tin Oxide) film, or the like, and form another example of the stripe transmissive electrodes of the present invention.

Like in the first embodiment, in the second embodiment, the refractive index of the transmissive insulating film 12 is set to a value lower than the refractive index of the liquid crystal which constitutes the liquid crystal layer 50 and the refractive index of the alignment layer 15. Also, the width of the transmissive insulating film 12 is set to be not less than a first predetermined width with which the reflectance of the multilayer film including the pixel electrodes 62, the transmissive insulating film 12, and the alignment layer 15 is at a maximum for blue light incident on the second substrate 20 side, and not more than a second predetermined width with which the reflectance of the multilayer film including the pixel electrodes 62, the transmissive insulating film 12, and the alignment layer 15 is at a maximum for red light incident on the second substrate 20 side. More specifically, the transmissive insulating film 12 includes, for example, silicon oxide as a main component so as to satisfy the above conditions, and the refractive index of the transmissive insulating film 12 is, for example, 1.5 or less, while the refractive index of the liquid crystal is 1.60, and the refractive index of the alignment layer 15 is 1.66. The transmissive insulating film 12 is formed by sputtering so that the width is, for example, 50 nm to 100 nm.

As described above, in the TFD active-matrix-driving-system reflective liquid crystal device of the second embodiment, an electric field is successively applied to the liquid crystal portions of the pixel electrodes 62 between the pixel electrodes 62 and the data lines 71 so that the alignment state of each of the liquid crystal portions can be controlled. It is thus possible to control the strength of external light reflected by the pixel electrodes 62 and emitted as display light though each of the liquid crystal portions. In this case, since external light incident on the second substrate 20 side passes through the liquid crystal layer 50, and is reflected by the multilayer film including the pixel electrodes 62, the transmissive insulating film 12, and the alignment layer 15, and is then emitted as display light through the liquid crystal layer 50, it is possible to achieve a bright image display with less parallax by using external light. Particularly, electric power is supplied to each of the pixel electrodes 62 through the TFD 40, thereby decreasing cross-talk between the respective pixel electrodes 62, and permitting the display of higher quality images.

Figure 12:
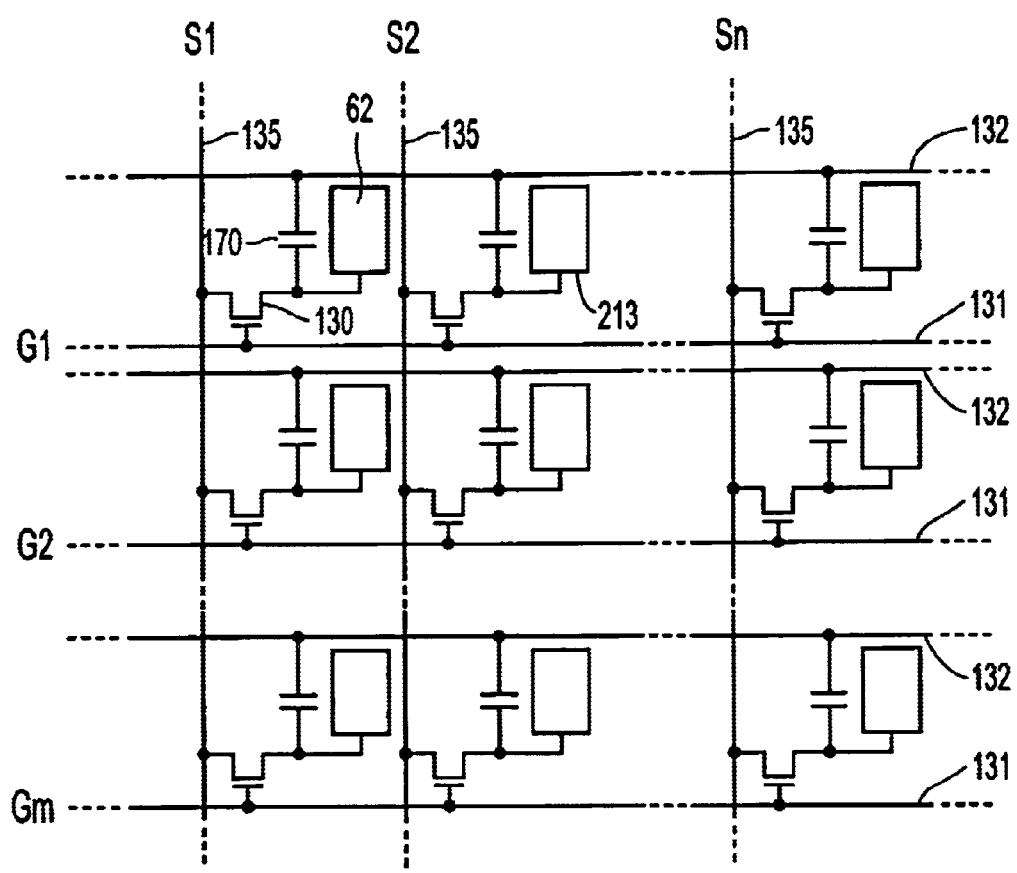
FIG. 12 is a drawing showing equivalent circuits of the pixel region in a TFT active-matrix-driving-system reflective liquid crystal device according to a third embodiment.
Figure 13:
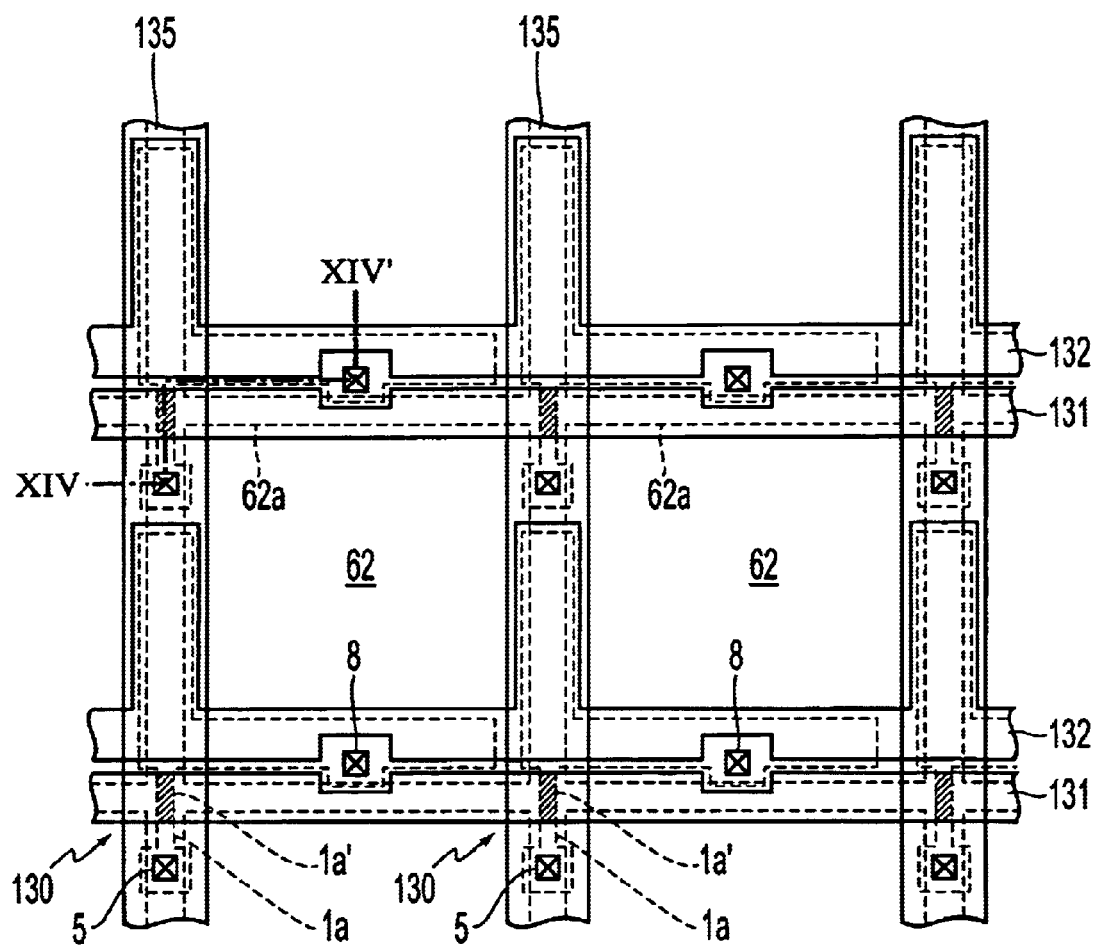
FIG. 13 is a plan view of the pixel region of the reflective liquid crystal device according to a third embodiment.
Figure 14:
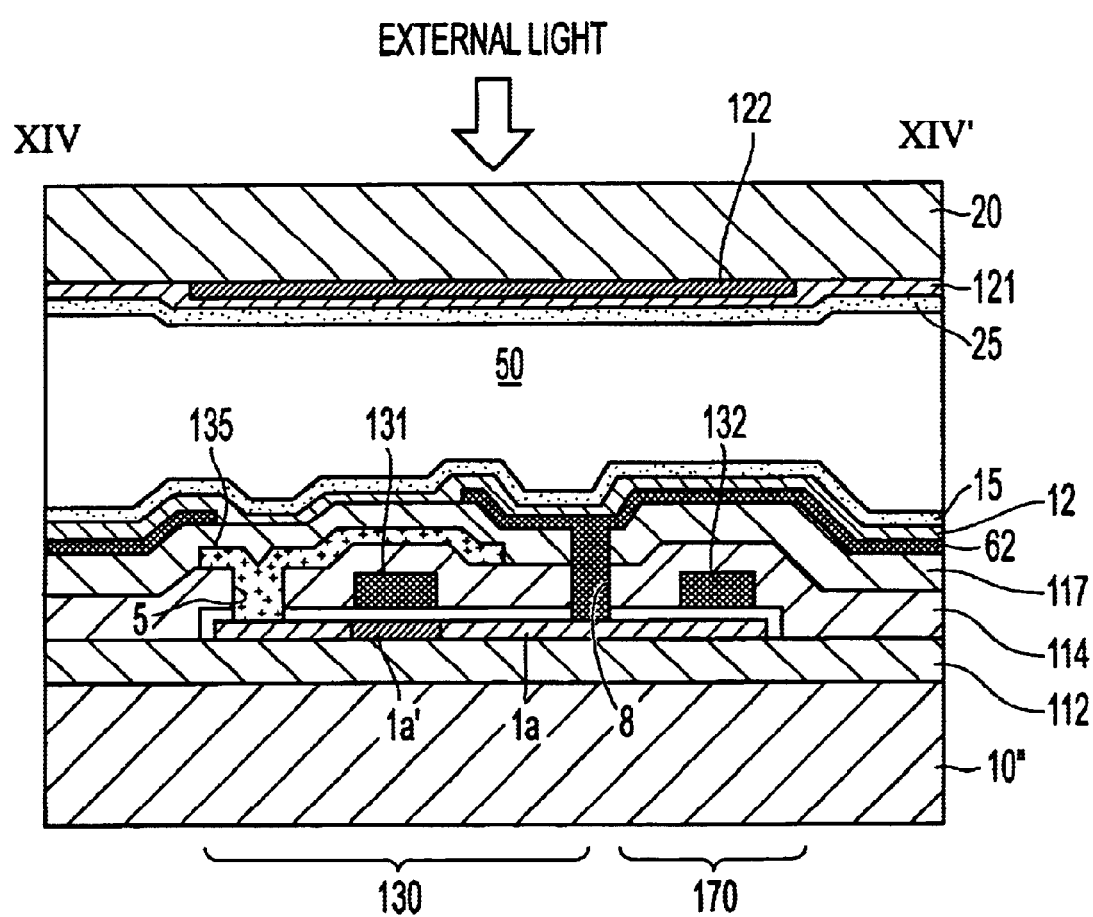
FIG. 14 is a sectional view taken along line XIV–XIV' of FIG. 13.

A liquid crystal device in accordance with a third embodiment of the present invention will be described with reference to FIGS. 12 to 14. In the third embodiment, the present invention is applied to a TFT active-matrix-driving-system reflective liquid crystal device. FIG. 12 shows equivalent circuits including various elements, wiring, etc. of a plurality of pixels which are arranged in a matrix to form the image display region of the liquid crystal device, FIG. 13 is a plan view showing groups of adjacent pixels on a TFT array substrate on which data lines, scanning lines, pixel electrodes, etc. are formed, and FIG. 14 is a sectional view taken along line XIV–XIV' of FIG. 13. In FIG. 14, layers and members are shown to different scales in order to show each of the layers and the members in a recognizable size in the drawing.

In the TFT active-matrix-driving-system reflective liquid crystal device of the third embodiment shown in FIG. 12, a plurality of TFTs 130 are formed in a matrix for controlling pixel electrodes 62 as another example of reflecting electrodes arranged in a matrix, and data lines 135, to which image signals are supplied, are electrically connected to the sources of the TFTs 130. Image signals S1, S2, . . . , Sn written on the data lines 135 may be supplied in this order in a line-sequential manner, or supplied for each group including the adjacent data lines 135. Also scanning lines 131 are electrically connected to the gates of the TFTs 130 so that pulsed scanning signals GI, G2, ..., Gm are supplied to the scanning lines 131 in a line-sequential manner with predetermined timing. The pixel electrodes 62 are electrically connected to the drains of the TFTs 130 so that the TFTs 130 serving as switching elements are switched off for a predetermined time to write the image signals S1, S2, ..., Sn supplied from the data lines 135 with predetermined timing. The image signals S1, S2, ..., Sn in a predetermined level written on the liquid crystal through the pixel electrodes 62 are held between the pixel electrodes and the counter electrodes (described below) formed on the counter substrate (described below). In order to prevent leakage of the held image signals, storage capacitors 170 are added in parallel with the liquid crystal capacitors between the pixels electrodes 62 and the counter electrodes.

In FIG. 13, the pixel electrodes 62 (the outlines 62a shown by dotted lines in the drawing) including reflecting films are arranged in a matrix on the TFT array substrate, and the data lines 135, the scanning lines 131 and capacitance lines 132 are provided along the longitudinal and transverse boundaries between the respective pixel electrodes 62. The data lines 135 are electrically connected to source regions of semiconductor layers 1a including a polysilicon film, or the like, through contact holes 5. The pixel electrodes 62 are electrically connected to the drain regions of the semiconductor layers 1a through contact holes 8. The capacitance lines 132 are arranged opposite to first storage capacitor electrodes extended from the drain regions of the semiconductor layers 1 a through insulating films to form the storage capacitors 170. The scanning lines 131 are arranged opposite to the channel regions 1a' shadowed by oblique lines in FIG. 13 in the semiconductor layers 1a so as to function as gate electrodes. In this way, the TFTs 130 are respectively provided at the intersections of the scanning lines 131 and the data lines 135, in which the scanning lines 131 are arranged as the gate electrodes opposite to the channel regions 1a'.

As shown in FIG. 14, the liquid crystal device includes a TFT array substrate 10" as another example of the first substrate, and a transmissive second substrate (counter substrate) 20 arranged opposite to the first substrate. The TFT array substrate 10" may be opaque, and, for example, includes a quartz substrate or semiconductor substrate. The second substrate 20 includes a transmissive glass substrate or quartz substrate, for example.

In this embodiment, like the reflecting electrodes 11 of the first embodiment, the pixel electrodes 62 provided on the TFT array substrate 10" include conductive reflecting films composed of, for example, aluminum as a main component, and are formed by aluminum deposition, or the like. Namely, the pixel electrodes 62 function as both pixel electrodes and reflectors in the reflective liquid crystal device.

Furthermore, like in the first embodiment, a transmissive insulating film 12 is provided on the sides (the upper surfaces shown in FIG. 14) of the pixel electrodes 62, the TFTs 130, etc., which contact the liquid crystal, and an alignment layer 15 including an organic thin film, for example, such as a polyimide thin film, or the like, and subjected to predetermined alignment processing, such as rubbing is provided on the transmissive insulating film 12.

On the other hand, a counter electrode 121 as another example of the transmissive electrode is provided over the entire surface of the second substrate 20, and a second light-shielding film 122 referred to as a black mask or black matrix is provided in the non-aperture regions of each of the pixels. An alignment layer 25 including an organic thin film, such as, for example, a polyimide thin film, or the like, and subjected to predetermined alignment processing, such as rubbing is provided below the counter electrode 121. A color filter including coloring material films arranged in a stripe, mosaic, or triangular form is provided on the second substrate 20 according to demand.

On the TFT array substrate 10" are provided the pixel switching TFTs 130 for switching control of the pixel electrodes 62 at the positions adjacent to the pixel electrodes 62.

Like in the first embodiment, a liquid crystal is sealed in the space surrounded by a sealing material between the TFT array substrate 10' and the second substrate 20 which are arranged so that the pixel electrodes 62 and the counter electrode 121 are opposed to each other, to form a liquid crystal layer 50.

Furthermore, a first interlayer insulating film 112 is provided below the plurality of pixel switching TFTs 130. The first interlayer insulating film 112 is formed over the entire surface of the TFT array substrate 10" to function as an under film for the pixel switching TFTs 130. For example, the first interlayer insulating film 112 includes a film of high-insulation glass, such as NSG (non-doped silicate glass), PSG (phosphorus silicate glass), BSG (boron silicate glass), BPSG (boron phosphorus silicate glass), or the like, a silicon oxide film, a silicon nitride film, or the like.

In FIG. 14, each of the pixel switching TFTs 130 includes the source region connected to the data line 135 through the contact hole 5, the channel region 1a' arranged opposite to the scanning line 131 through the gate insulating film, and the drain region connected to the pixel electrode 62 through the contact hole 8. The data lines 131 include a light-shielding conductive thin film, such as a low-resistance metal film of Al, or the like, or an alloy film of metal silicide, or the like. A second interlayer insulating film 114 having the contact holes 5 and 8 formed therein is also formed on the data lines 131, and a third interlayer insulating film 117 having the contact holes 8 formed therein is further formed on the second interlayer insulating film 114. Like the first interlayer insulating film 112, each of the second and third interlayer insulating films 114 and 117 includes a film of high-insulation glass, such as NSG, PSG, BSG, BPSG, or the like, a silicon oxide film, a silicon nitride film, or the like.

The pixel switching TFTs 130 may be TFTs having any one of a LDD structure, an offset structure, a self alignment structure, etc. Besides a single gate structure, each of the TFTs 130 may include a dual gate or at least triple gate.

In this embodiment, like in the first embodiment, particularly, the refractive index of the transmissive insulating film 12 formed on the pixel electrodes 62 is set to be lower than the refractive index of the liquid crystal which constitutes the liquid crystal layer 50 and the refractive index of the alignment layer 15. Furthermore, the width of the transmissive insulating film 12 is set to be not less than a first predetermined width with which the reflection of the multilayer film including the pixel electrodes 62, the transmissive insulating film 12, and the alignment layer 15 is at a maximum for blue light incident on the second substrate 20 side, and not more than a second predetermined width with which the reflection of the multilayer film including the pixel electrodes 62, the transmissive insulating film 12, and the alignment layer 15 is at a maximum for red light incident on the second substrate 20 side. More specifically, the transmissive insulating film 12 is composed of silicon oxide as a main component so as to satisfy the above conditions, and the refractive index of the transmissive insulating film 12 is, for example, 1.5 or less, while the refractive index of the liquid crystal is 1.60, and the refractive index of the alignment layer 15 is 1.66. The transmissive insulating film 12 is formed by sputtering, for example, so that the width is 50 to 100 nm.

As described above, in the TFT active-matrix-driving-system reflective liquid crystal device of the third embodiment, an electric field is successively applied to the liquid crystal portions of the respective pixel electrodes 62 to control the alignment state of each of the liquid crystal portions between the pixel electrodes 62 and the counter electrode 121, thereby permitting control of the strength of external light reflected by the pixel electrodes 62 and emitted as display light through the each of the liquid crystal portions. At this time, external light incident on the second substrate 20 side passes through the liquid crystal layer 50, and is subjected to multiple reflection by the multilayer film including the pixel electrodes 62, the transmissive insulating film 12, and the alignment layer 15, and is again emitted as display light through the liquid crystal layer 50. This enables a bright image display with less parallax by using external light. Particularly, since electric power is supplied to each of the pixel electrodes 62 through the TFT 130, cross-talk between the respective pixel electrodes 62 can be reduced, and higher-quality image display is possible.

The pixel electrodes 62 may be driven by a lateral electric field parallel to the substrate between the respective pixel electrodes 62 provided on the first substrate 10, without the counter electrode provided on the second substrate 20.

A liquid crystal device in accordance with a fourth embodiment of the present invention will be described with reference to FIGS. 15(a)-15(c). In the fourth embodiment, the reflective liquid crystal device of each of the first to third embodiments of the present invention is applied to various electronic equipment.

Figure 15A:
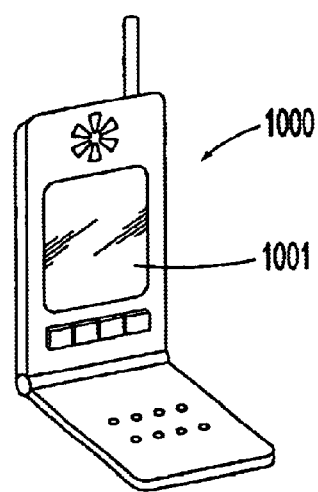
FIGS. 15(a)–15(c) are drawings showing the appearances of various electronic equipment according to a fourth embodiment of the present invention.

The reflective liquid crystal device of each of the first to third embodiments is applied to the display unit 1001 of such a portable telephone 1000, as shown in FIG. 15(a). This can simplify the construction of a device and the manufacturing process therefor, and realize an energy-saving portable telephone which performs high-definition black-and-white or color reflective display with a high contrast and substantially no parallax.

Figure 15B:
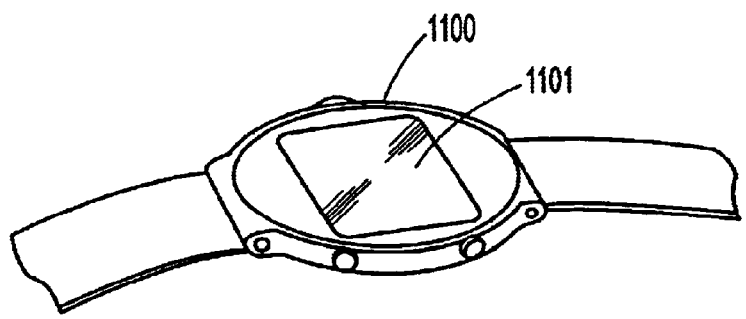

When the liquid crystal device is applied to the display unit 1101 of such a wristwatch 1100 as shown in FIG. 15(b), it is possible to simplify the construction of the device and the manufacturing process therefor, and realize an energy-saving wristwatch which performs high-definition black-and-white or color reflective display with a high contrast and substantially no parallax.

Figure 15C:
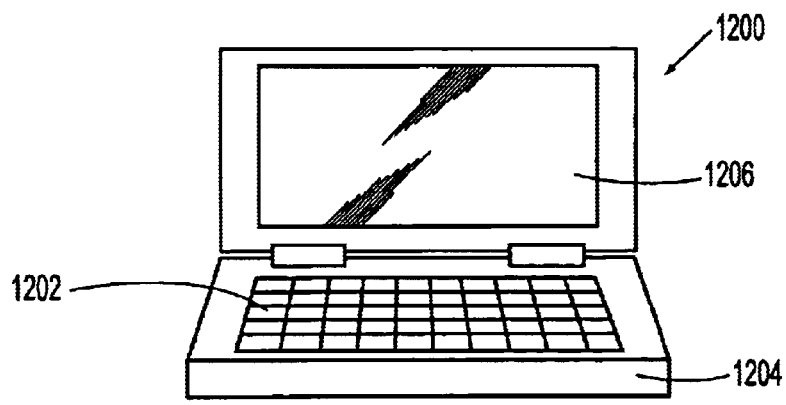

When the liquid crystal device is applied to a display screen 1206 provided in a cover which can be opened and closed, and which is mounted to a body 1204 with a keyboard 1202 in such a personal computer (or an information terminal) as shown in FIG. 15(c), it is possible to simplify the construction of the device and the manufacturing process therefor, and realize an energy-saving personal computer which performs high-definition black-and-white or color reflective display with a high contrast and substantially no parallax.

Besides the electronic equipment shown in FIG. 15, the reflective liquid crystal devices of the first to third embodiments can be applied to electronic equipment, such as a liquid crystal television, a view finder type or monitor direct viewing type video tape recorder, a car navigator, an electronic notebook, a electronic calculator, a word processor, an engineering work station (EWS), a picture telephone, a POS terminal, an apparatus including a touch panel, etc.

Although, in the above-described first to fourth embodiments, the present invention is applied to a reflective liquid crystal device, the present invention can also be applied to a transflective liquid crystal device in which transflective electrodes having light transmission openings and serving as transflectors are used instead of the reflecting electrodes serving as reflectors, or light transmission spaces are provided between the respective reflecting electrodes, and a light source is provided on the side of the electrodes opposite to the liquid crystal.

The present invention is not limited to the above-described embodiments, and the embodiments can be appropriately changed within the range of the gist of the present invention.

What is claimed is:

1. A liquid crystal device comprising:
   a first substrate;
   a transmissive second substrate arranged to oppose the first substrate;
   a liquid crystal held between the first and second substrates;
   a plurality of reflecting electrodes arranged on a side of the first substrate that is opposed to the second substrate;
   a transmissive insulating film having a single-layer structure arranged on the reflecting electrodes; and
   an alignment layer arranged on the transmissive insulating film, the refractive index of the transmissive insulating film being set to be lower than the refractive index of the liquid crystal and the refractive index of the alignment layer, and the thickness of the transmissive insulating film being set to be not less than a first predetermined thickness with which the reflectance of a multilayer film comprising the reflecting electrodes, the transmissive insulating film, and the alignment layer is at a maximum for blue light incident on the second substrate side, and not more than a second predetermined thickness with which the reflectance of the multilayer film is at a maximum for red light incident of the second substrate side, the transmissive insulating film comprising inorganic oxide particles having an average particle size of 50 nm or less.

2. The liquid crystal device according to claim 1, the reflecting electrodes comprising aluminum as a main component.

3. A liquid crystal device comprising:
   a first substrate;
   a transmissive second substrate arranged to oppose the first substrate;
   a liquid crystal held between the first and second substrates;
   a plurality of reflecting electrodes arranged on a side of the first substrate that is opposed to the second substrate;
   a transmissive insulating film having a single-layer structure arranged on the reflecting electrodes; and
   an alignment layer arranged on the transmissive insulating film, the refractive index of the transmissive insulating film being set to be lower than the refractive index of the liquid crystal and the refractive index of the alignment layer, and the thickness of the transmissive insulating film being set to be not less than a first predetermined thickness with which the reflectance of a multilayer film comprising the reflecting electrodes, the transmissive insulating film, and the alignment layer is at a maximum for blue light incident on the second substrate side, and not more than a second predetermined thickness with which the reflectance of the multilayer film is at a maximum for red light incident on the second substrate side, the thickness of the transmissive insulating film being set to a value near a third predetermined thickness, rather than the first and second predetermined thicknesses, which is between the first and second predetermined thicknesses, and with which the reflectance of the multilayer film is at a maximum for green light incident on the second substrate side, the transmissive insulating film comprising inorganic oxide particles having an average particle size of 50 nm or less.

4. A liquid crystal device comprising:

a first substrate;

a transmissive second substrate arranged to oppose the first substrate;

a liquid crystal held between the first and second substrates;

a plurality of reflecting electrodes arranged on a side of the first substrate that is opposed to the second substrate;

a transmissive insulating film having a single-layer structure arranged on the reflecting electrodes; and an alignment layer arranged on the transmissive insulating film, the refractive index of the transmissive insulating film being set to be lower than the refractive index of the liquid crystal and the refractive index of the alignment layer, and the thickness of the transmissive insulating film being set to be not less than a first predetermined thickness with which the reflectance of a multilayer film comprising the reflecting electrodes, the transmissive insulating film, and the alignment layer is at a maximum for blue light incident on the second substrate side, and not more than a second predetermined thickness with which the reflectance of the multilayer film is at a maximum for red light incident on the second substrate side, the refractive index of the transmissive insulating film is 1.5 or less, and the thickness of the transmissive insulating film is 50 to 100 nm, the transmissive insulating film comprising inorganic oxide particles having an average particle size of 50 nm or less.

5. A liquid crystal device comprising:

a first substrate;

a transmissive second substrate arranged to oppose the first substrate;

a liquid crystal held between the first and second substrates;

a plurality of reflecting electrodes arranged on a side of the first substrate that is opposed to the second substrate;

a transmissive insulating film having a single-layer structure arranged on the reflecting electrodes; and an alignment layer arranged on the transmissive insulating film, the refractive index of the transmissive insulating film being set to be lower than the refractive index of the liquid crystal and the refractive index of the alignment layer, and the thickness of the transmissive insulating film being set to be not less than a first predetermined thickness with which the reflectance of a multilayer film comprising the reflecting electrodes, the transmissive insulating film, and the alignment layer is at a maximum for blue light incident on the second substrate side, and not more than a second predetermined thickness with which the reflectance of the multilayer film is at a maximum for red light incident on the second substrate side, the transmissive insulating film comprising silicon oxide as a main component, the transmissive insulating film comprising inorganic oxide particles having an average particle size of 50 nm or less.

6. A liquid crystal device comprising:

a first substrate;

a transmissive second substrate arranged to oppose the first substrate;

a liquid crystal held between the first and second substrates;

a plurality of reflecting electrodes arranged on a side of the first substrate that is opposed to the second substrate;

a transmissive insulating film having a single-layer structure arranged on the reflecting electrodes; and an alignment layer arranged on the transmissive insulating film, the refractive index of the transmissive insulating film being set to be lower than the refractive index of the liquid crystal and the refractive index of the alignment layer, and the thickness of the transmissive insulating film being set to be not less than a first predetermined thickness with which the reflectance of a multilayer film comprising the reflecting electrodes, the transmissive insulating film, and the alignment layer is at a maximum for blue light incident on the second substrate side, and not more than a second predetermined thickness with which the reflectance of the multilayer film is at a maximum for red light incident on the second substrate side, the transmissive insulating film comprising inorganic oxide particles having an average particle size of 50 nm or less, the reflecting electrodes comprising a plurality of stripe reflecting electrodes including conductive reflecting films, and a plurality of stripe transmissive electrodes comprising conductive transmissive films being further provided on the second substrate so as to cross the stripe reflecting electrodes.

7. A liquid crystal device comprising:

a first substrate;

a transmissive second substrate arranged to oppose tile first substrate;

a liquid crystal held between the first and second substrates;

a plurality of reflecting electrodes arranged on a side of the first substrate that is opposed to the second substrate;

a transmissive insulating film having a single-layer structure arranged on the reflecting electrodes; and an alignment layer arranged on the transmissive insulating film, the refractive index of the transmissive insulating film being set to be lower than the refractive index of the liquid crystal and the refractive index of the alignment layer, and the thickness of the transmissive insulating film being set to be not less than a first predetermined thickness with which the reflectance of a multilayer film comprising the reflecting electrodes, the transmissive insulating film, and the alignment layer is at a maximum for blue light incident on the second substrate side, and not more than a second predetermined thickness with which the reflectance of the multilayer film is at a maximum for red light incident on the second substrate side, the transmissive insulating film comprising inorganic oxide particles having an average particle size of 50 nm or less, the reflecting electrodes comprising a plurality of pixel electrodes including conductive reflecting films and arranged in a matrix, a two-terminal switching element connected to each of the pixel electrodes being provided on the first substrate, and one of a plurality of scanning lines and a plurality of data lines connected to the two-terminal switching elements being provided on the first substrate, and the other one of the plurality of scanning lines and the plurality of data lines being provided on the second substrate so as to cross the one of the plurality of scanning lines is and the plurality of data lines.

8. A liquid crystal device comprising:

a first substrate;

a transmissive second substrate arranged to oppose the first substrate;

a liquid crystal held between the first and second substrates;

a plurality of reflecting electrodes arranged on a side of the first substrate that is opposed to the second substrate;

a transmissive insulating film having a single-layer structure arranged on the reflecting electrodes; and an alignment layer arranged on the transmissive insulating film, the refractive index of the transmissive insulating film being set to be lower than the refractive index of the liquid crystal and the refractive index of the alignment layer, and the thickness of the transmissive insulating film being set to be not less than a first predetermined thickness with which the reflectance of a multilayer film comprising the reflecting electrodes, the transmissive insulating film, and the alignment layer is at a maximum for blue light incident on the second substrate side, and not more than a second predetermined thickness with which the reflectance of the multilayer film is at a maximum for red light incident on the second substrate side, the transmissive insulating film comprising inorganic oxide particles having an average particle size of 50 nm or less, the reflecting electrodes comprising a plurality of pixel electrodes including conductive reflecting films arranged in a matrix, and a three-terminal switching element connected to each of the pixel electrodes, and a plurality of scanning lines and a plurality of data lines connected to the three-terminal switching elements being provided on the first substrate.

* * * * *